(12) United States Patent
Cole et al.

(10) Patent No.: US 10,929,811 B2
(45) Date of Patent: Feb. 23, 2021

(54) SYSTEMS AND METHODS FOR MAPPING LOCATIONS OF CARTONS IN PALLETS AND CONTAINERS

(71) Applicant: ABB Schweiz AG, Baden (CH)

(72) Inventors: Gregory A. Cole, West Hartford, CT (US); Thomas A. Fuhlbrigge, Ellington, CT (US)

(73) Assignee: ABB Schweiz AG, Baden (CH)

( * ) Notice: Subject to any disclaimer, the term of this patent is extended or adjusted under 35 U.S.C. 154(b) by 98 days.

(21) Appl. No.: 16/365,215

(22) Filed: Mar. 26, 2019

(65) Prior Publication Data

US 2020/0311656 A1    Oct. 1, 2020

(51) Int. Cl.
*G06Q 10/08* (2012.01)
*G06T 17/00* (2006.01)

(52) U.S. Cl.
CPC ........... *G06Q 10/087* (2013.01); *G06T 17/00* (2013.01)

(58) Field of Classification Search
CPC ........ G06Q 10/00; G06Q 10/08; G06Q 30/00; B65G 1/04; B65G 1/137; G06F 7/00; B25J 9/16
USPC ........... 705/29, 334, 14.1, 28; 414/801, 802; 700/216, 214
See application file for complete search history.

(56) References Cited

U.S. PATENT DOCUMENTS

| | | | | |
|---|---|---|---|---|
| 5,934,864 A * | 8/1999 | Lyon | ...................... | B65G 1/1378 414/791.6 |
| 6,762,681 B1 * | 7/2004 | Danelski | ................. | B65G 1/137 340/568.1 |
| 6,876,958 B1 * | 4/2005 | Chowdhury | ........... | G06Q 10/04 414/801 |
| 9,102,055 B1 * | 8/2015 | Konolige | ................. | G06T 7/593 |
| 9,171,277 B2 * | 10/2015 | Rutt | ...................... | G06Q 10/083 |
| 9,656,804 B2 * | 5/2017 | Lyon | ................... | G06Q 30/0635 |
| 10,005,564 B1 * | 6/2018 | Bhatia | ....................... | B64C 1/22 |
| 10,471,597 B1 * | 11/2019 | Murphy | ............... | B65G 1/1378 |
| 10,647,509 B2 * | 5/2020 | Lyon | .................... | B65G 1/1373 |

(Continued)

OTHER PUBLICATIONS

European Patent Office, International Search Report in International Patent Application No. PCT/IB2020/052870, 5 pp. (dated May 13, 2020).

(Continued)

*Primary Examiner* — Olusegun Goyea
(74) *Attorney, Agent, or Firm* — Leydig, Voit & Mayer, Ltd.

(57) ABSTRACT

Systems, methods and software for mapping locations of cartons are provided. The method includes, for a first carton, assigning a first identifier to the first carton received for positioning in: a pallet space of a pallet, or in a container space of a container. The method includes determining one or more physical properties of the first carton. The method includes associating the one or more physical properties of the first carton with the first identifier. The method includes determining an as-positioned location of the first carton in the pallet space or in the container space. The method includes generating a three-dimensional (3D) map of the pallet space or the container space. The 3D is generated based on: the determined one or more physical properties of the first carton, and the determined as-positioned location of the first carton in the pallet space or in the container space.

21 Claims, 7 Drawing Sheets

(56) References Cited

U.S. PATENT DOCUMENTS

| | | | | |
|---|---|---|---|---|
| 2010/0057245 A1* | 3/2010 | Hironaka | ............... | G06Q 10/08 |
| | | | | 700/214 |
| 2010/0324959 A1* | 12/2010 | Templeton | ........... | G06Q 10/087 |
| | | | | 705/334 |
| 2013/0211977 A1* | 8/2013 | Lyon | ...................... | G06Q 10/00 |
| | | | | 705/29 |
| 2015/0081088 A1* | 3/2015 | Lyon | ................. | G06Q 10/0875 |
| | | | | 700/216 |
| 2016/0129592 A1* | 5/2016 | Saboo | .................. | G05D 1/0297 |
| | | | | 700/248 |
| 2017/0217683 A1* | 8/2017 | Lyon | .................... | B65G 1/1373 |
| 2018/0060764 A1* | 3/2018 | Hance | .................... | G06Q 50/28 |
| 2018/0157873 A1* | 6/2018 | Roth | ................. | G06Q 10/0833 |
| 2018/0370727 A1* | 12/2018 | Hance | ...................... | B25J 5/007 |
| 2020/0250455 A1* | 8/2020 | Greenwald | ........ | G06Q 30/0206 |

OTHER PUBLICATIONS

European Patent Office, Written Opinion in International Patent Application No. PCT/IB2020/052870, 6 pp. (dated May 13, 2020).
Robotics Enabling Fully-Integrated Logistics Lines for Supermarkets—REFILLS (Project ID: 731590), European Commission [retrieved on Sep. 20, 2018]. Retrieved from the Internet: <URL: www.refills-project.eu>.
Bryan Gardiner, How to Load a Giant Container Ship, WIRED, Aug. 1, 2013, 06:30 AM [retrieved on Oct. 5, 2018]. Retrieved from the Internet: <URL: https://www.wired.com/2013/08/qq-containership/?intcid=inline_amp>.

\* cited by examiner

SYSTEMS AND METHODS FOR MAPPING LOCATIONS OF CARTONS IN PALLETS AND CONTAINERS

TECHNICAL FIELD

The present disclosure relates to mapping locations of cartons in pallets and containers, and, more particularly, to generating 3D maps of pallets and containers based on determined identities and as-positioned locations of the cartons in the pallets and containers.

BACKGROUND

Pallets and containers are used extensively for logistical operations in a number of industries. For instance, in the retail supply chain, goods to be sold in stores and on the Internet are packed into cartons, which are then constructed onto pallets and loaded onto containers. The pallets and containers are then shipped from their place of production to intermediate locations such as ports, rail and trucking terminals, and supply and distribution centers. In transit between the various locations in the logistical supply chain, pallets and containers may be transferred from facility-to-facility and from vehicle-to-vehicle. In the case of Internet sales, the final destination may be homes or place of business of consumers. In the case of retail stores as the final destination for the cartons, the cartons are de-palletized from pallets or unloaded from containers for presentation of the goods for sale to consumers.

For mixed pallets and containers—that is, for pallets and containers that have a non-homogenous load, including cartons of varying shapes, sizes, orientation, weights, and goods—randomness of carton placement, cumbersome record-keeping, unstable loads, loss and/or damage to goods, and other inefficiencies may result in presently known logistic systems and methods. In at least some known systems and methods, the aforementioned inefficiencies may be compounded over time as cartons are removed and new cartons are loaded at various in-transit points. Implementing autonomous or semi-autonomous, including robotic-based, carton handling systems and methods in the construction and de-palletizing of pallets and the loading and unloading of containers at the various steps of logistical supply chain has been challenging. The problems in known systems and methods are due, at least in part, to the amount of information required to be obtained, tracked, traced, and processed efficiently, as well as the number of transfer steps in the supply chain. Therefore, there is a need for improved pallet and container-based logistical supply chain methods and systems for providing accurate, traceable, and trackable information about the locations, contents, identities, and other attributes of the pallets, containers, and cartons present on them.

SUMMARY OF THE DISCLOSURE

One aspect of the disclosure is a method for mapping locations of cartons during construction and de-palletizing of a pallet or loading and loading of a container with the cartons. For a first carton, the method includes: (i) assigning a first identifier to the first carton received for positioning in: a pallet space of a pallet, or in a container space of a container; (ii) determining one or more physical properties of the first carton; (iii) associating the one or more physical properties of the first carton with the first identifier; (iv) determining an as-positioned location of the first carton in the pallet space or in the container space; and (v) generating a three-dimensional (3D) map of the pallet space or the container space based on: the determined one or more physical properties of the first carton, and the determined as-positioned location of the first carton in the pallet space or in the container space.

Another aspect of the disclosure is a system for mapping locations of cartons. The system includes one or more memory devices, and one or more processors in communication with the one or more memory devices. For a first carton, the one or more processors are programmed to: (i) assign a first identifier to the first carton received for positioning in: a pallet space of a pallet, or in a container space of a container; (ii) determine one or more physical properties of the first carton; (iii) associate the one or more physical properties of the first carton with the first identifier; (iv) determine an as-positioned location of the first carton in the pallet space or in the container space; and (v) generate a three-dimensional (3D) map of the pallet space or the container space based on: the determined one or more physical properties of the first carton, and the determined as-positioned location of the first carton in the pallet space or in the container space.

Yet another aspect of the disclosure is a non-transient computer-readable storage medium storing processor-executable instructions for mapping locations of cartons. When executed by one or more processors, the processor-executable instructions cause the one or more processors to, for a first carton: (i) assign a first identifier to the first carton received for positioning in: a pallet space of a pallet, or in a container space of a container; (ii) determine one or more physical properties of the first carton; (iii) associate the one or more physical properties of the first carton with the first identifier; (iv) determine an as-positioned location of the first carton in the pallet space or in the container space; and (v) generate a 3D map of the pallet space or the container space based on: the determined one or more physical properties of the first carton, and the determined as-positioned location of the first carton in the pallet space or in the container space.

Further and alternative aspects and features of the disclosed principles will be appreciated from the following detailed description and the accompanying drawings. As will be appreciated, the principles related to systems, methods, and software for mapping locations of cartons disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
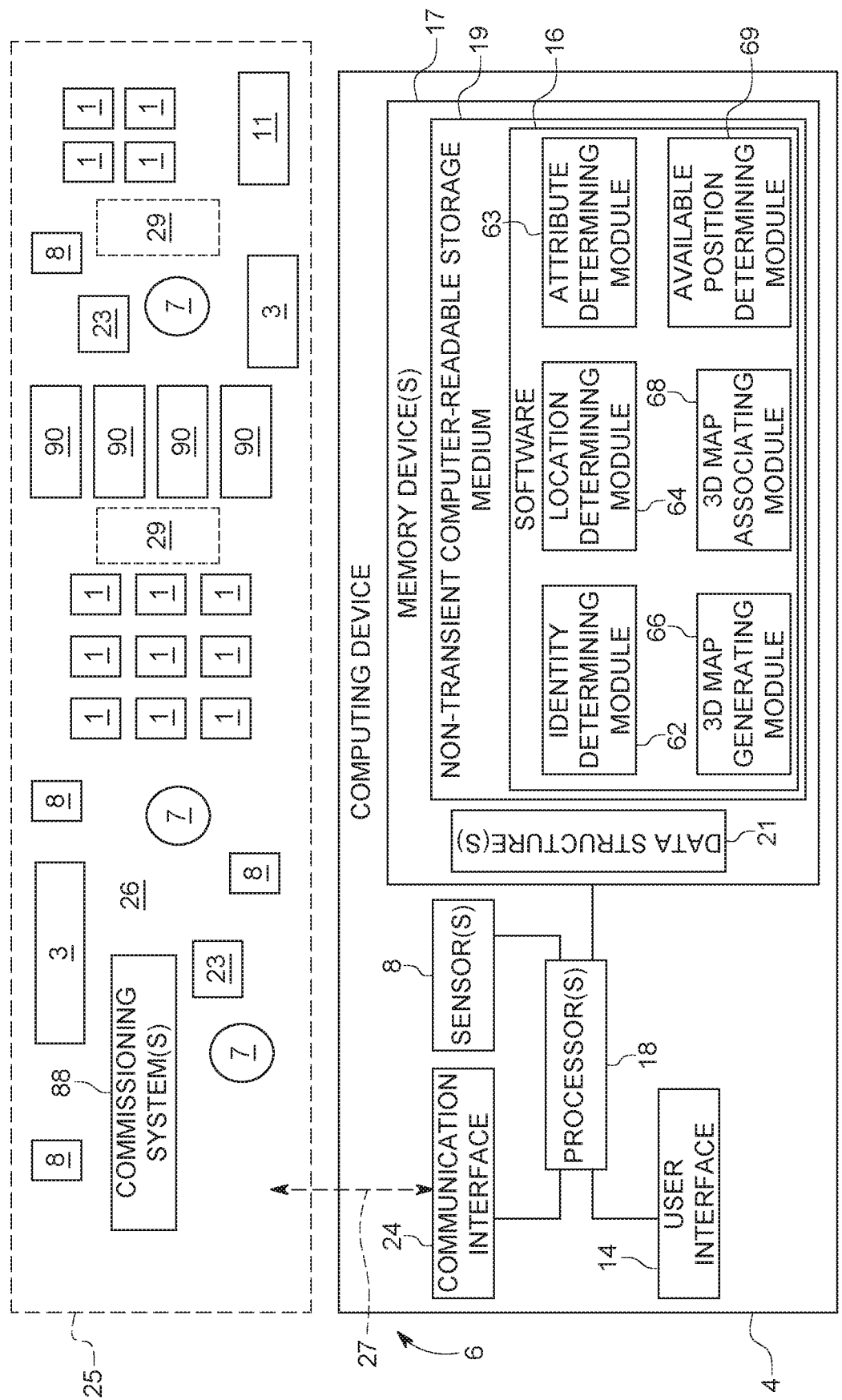
FIG. 1 is a block diagram of a system for mapping locations of cartons in pallets or containers according to an embodiment of the disclosure.
Figure 2:
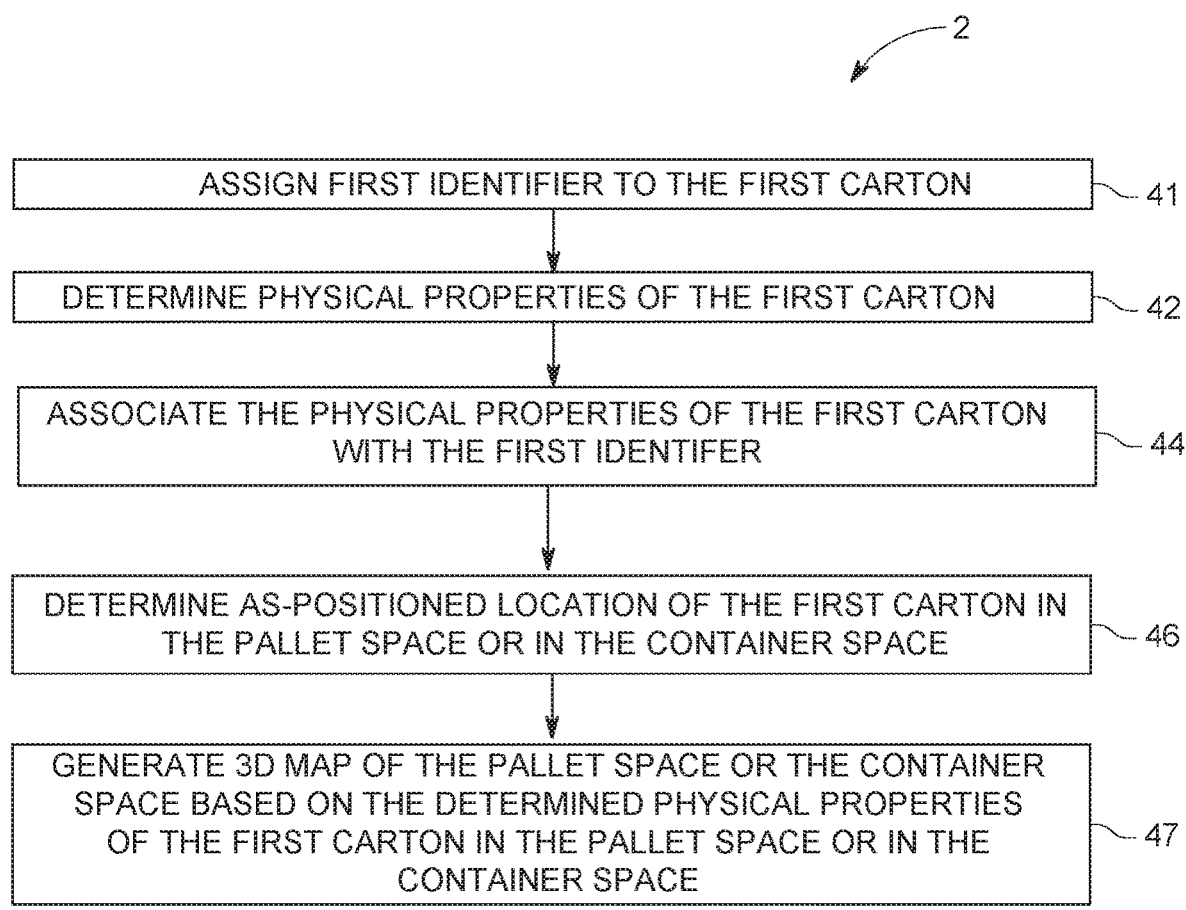
FIG. 2 is a flowchart of a method for mapping locations of cartons in pallets or containers according to an embodiment of the disclosure.

FIG. 1 is a block diagram of a system 6 for mapping locations of cartons 3 in pallets 1 or containers 90, and FIG. 2 is a flowchart of a method 2 for mapping locations of cartons 3 in pallets 1 or containers 90, in accordance with the disclosure. As used herein, "carton" and "cartons" means any physical object(s) that is/are amenable to being stored, transported, received, shipped, and/or displayed in, or on, a pallet or a container. Such physical objects may take many forms in terms of their shapes, dimensions, materials, weights, quantities, and/or values (monetary or otherwise). Such physical objects may be solid, hollow, symmetric in shape and/or mass distribution or they may be asymmetric in these regards. Such physical objects may enclose or otherwise contain other objects or materials therein (e.g., a cardboard box holding one or more items), including for purposes of protection of such items from exterior elements, isolating such items from the exterior space, and/or convenience during handling.

In the embodiment shown in FIG. 2, the exemplary method 2 is implemented and performed, at least in part, by the system 6. The system 6 includes a computing device 4. The computing device 4 includes hardware and software components operably coupled in communication with one another. The computing device 4 is also operably coupled to an electric power source (not shown in FIG. 1). As used herein, the term "operably coupled in communication" means that two or more hardware components of the disclosed systems (e.g., system 6) are capable of transmitting and/or receiving electrical and/or optical signals 27 to and/or from each other. This transmitting and/or receiving includes using either wired, wireless, or both types of data connections and/or data communication protocols. This transmitting and/or receiving also includes transmitting and/or receiving electrical and/or optical signals 27 either over very short distances (e.g., within the confines of the computing device 4) and/or over distances spanning continents (e.g., transmitting and/or receiving data via the Internet or via satellites).

The computing system 4 includes one or more processors 18 operably coupled in communication with one or more memory devices 17. The memory devices 17 include a non-transient computer-readable storage medium 19 storing processor 18-executable instructions for mapping locations of cartons 3 during construction of a pallet 1 or loading of a container 90 with the cartons 3. When the program instructions are executed by one or more processors 18, the program instructions cause the one or more processors 18 to perform the disclosed methods (e.g., method 2) for mapping locations of cartons 3 in pallets 1 or containers 90, including by using the disclosed systems (e.g., system 6). The processor 18-executable instructions are encoded as software 16 and stored in the non-transient computer-readable storage medium 19.

The memory device(s) 17 include one or more data structures 21. The data structures 21 in memory device(s) 17 store data received directly or indirectly from processor 18. The data received and stored in data structures 21 includes data input from users 7 of system 6. The data from users 7 is input directly into the computing device 4 via a user interface 14. The data from users 7 is input into client device(s) 23 communicatively coupled to the computing device 4 via a communication interface 24.

The system 6 includes one or more sensors 8. The data stored in data structures 21 may include data received from one or more sensors 8. The sensors 8 are positioned either in the computing device 4, outside or distal the computing device 4, or both. In an example, the sensors 8 are positioned in a facility 25 defined by a facility space 26. The sensors 8 are positioned in the facility 25 as either stationary or mobile sensors 8, or both. The sensors 8 are positioned in the facility 25 proximate one or more loading areas 29 for pallets 1 or containers 90. In one example, the sensor(s) 8 move relative to stationary pallet(s) 1 (or container(s) 90). In another example, the pallet(s) 1 (of the container(s) 90) move relative to stationary sensor(s) 8. The facility 25 includes a warehouse, a receiving and/or distribution center, or other interior and exterior facilities used for logistical operations. In another example, the sensors 8 are positioned in or on a vehicle defined by a vehicle space. Examples of vehicles are a tractor trailer or other truck, a cargo van, a container ship, a freight train car, a cargo airplane or other aircraft, a space travel vessel (e.g., a space shuttle), and the like.

The system includes one or more servers 11 positioned in the facility 25 or in or on the vehicle. In an example, the sensors 8 are coupled in communication with the server 11 and the server 11 is coupled in communication with the communication interface 24 of the computing device 4. In those examples, the data from sensors 8 is received by the communication interface 24 via the server 11. In another example, the computing device 4 is included in the server 11. In other examples, at least some of the system 6 is distributed between one or more computing device(s) 4, one or more sensor(s) 8, and/or one or more server(s) 11. As such, the system 6 is a networked system 6 based on a distributed computing, communication, and/or sensing architecture.

Figure 3A:
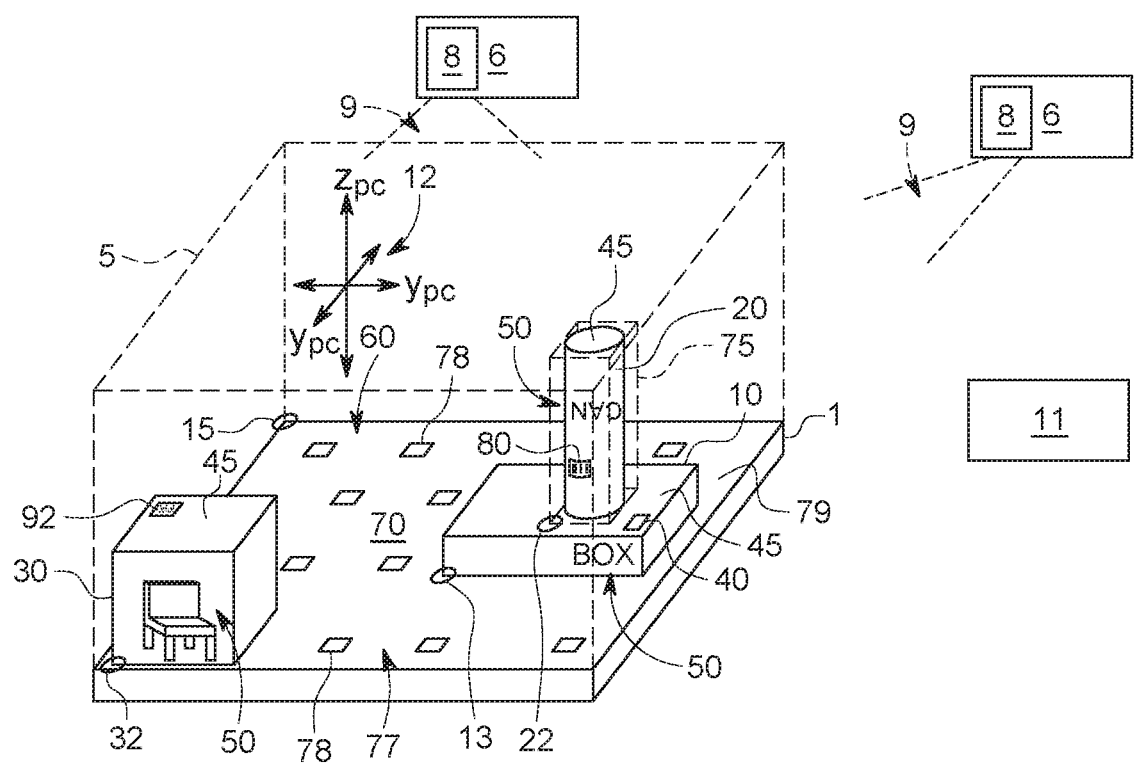
FIG. 3A is a perspective view of a pallet during construction according to an embodiment of the disclosure.
Figure 3B:
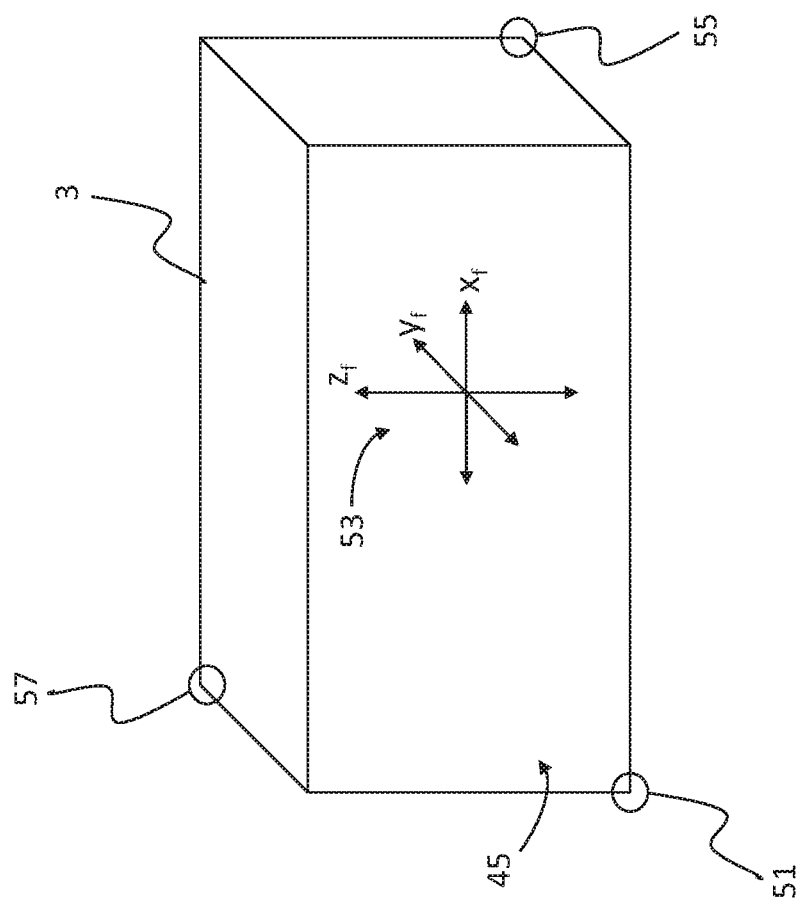
FIG. 3B is a perspective view of a carton with assigned coordinate frame and local origin.
Figure 4:
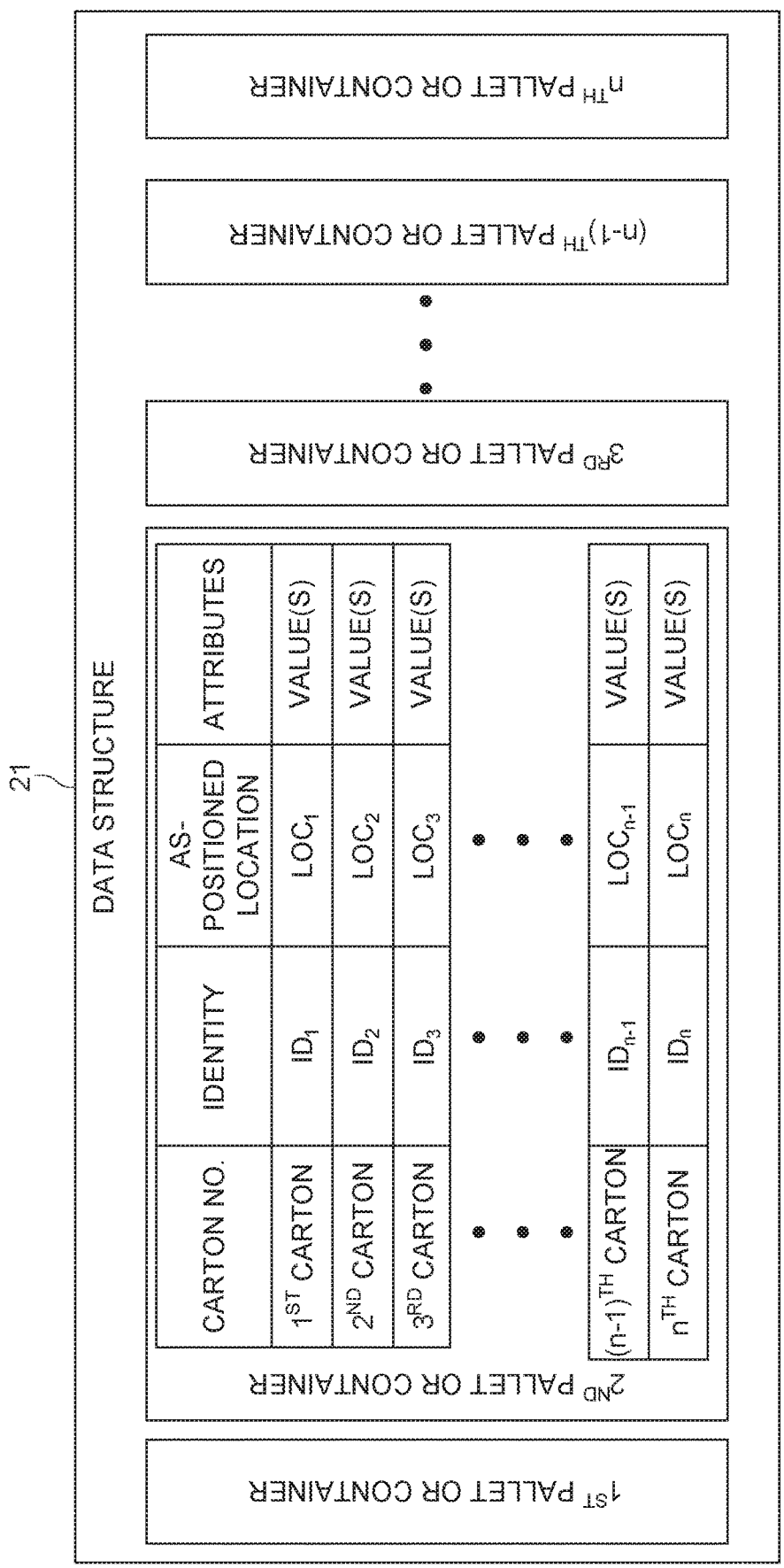
FIG. 4 is a block diagram of a data structure according to an embodiment of the disclosure that may be used with the system of FIG. 1 and the method of FIG. 2.
Figure 5:
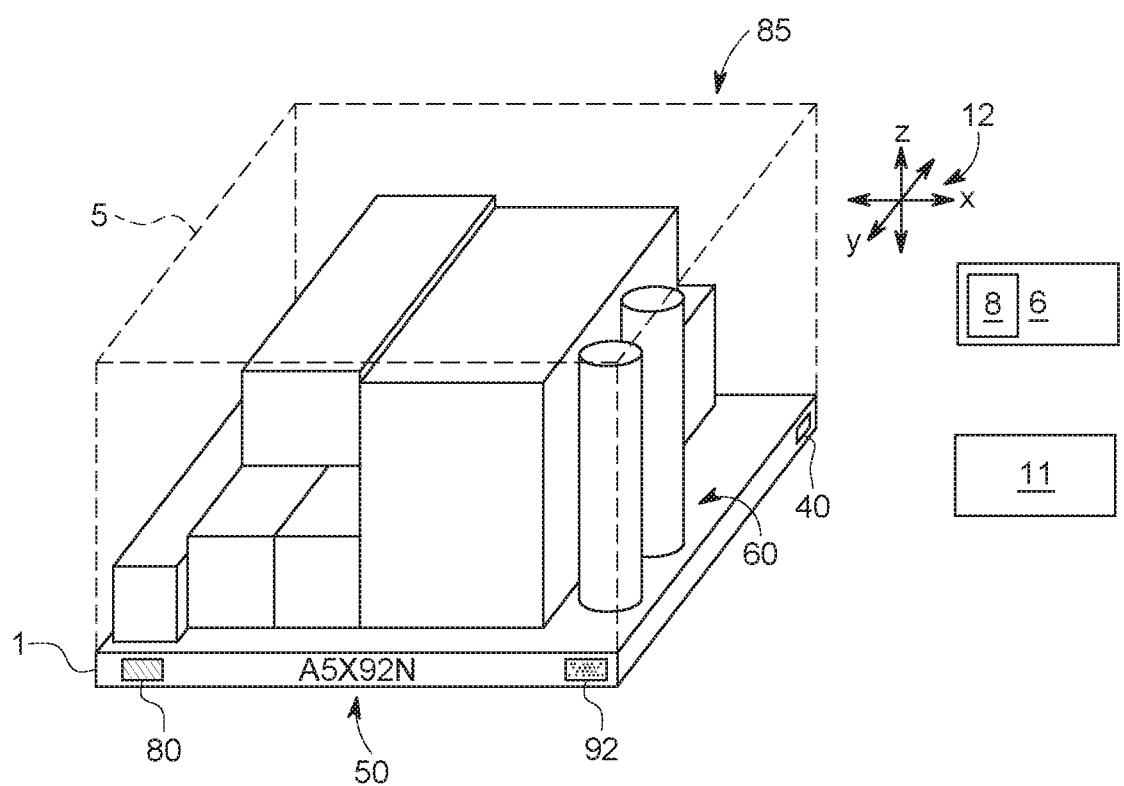
FIG. 5 is a perspective view of an as-constructed pallet according to an embodiment of the disclosure.
Figure 6:
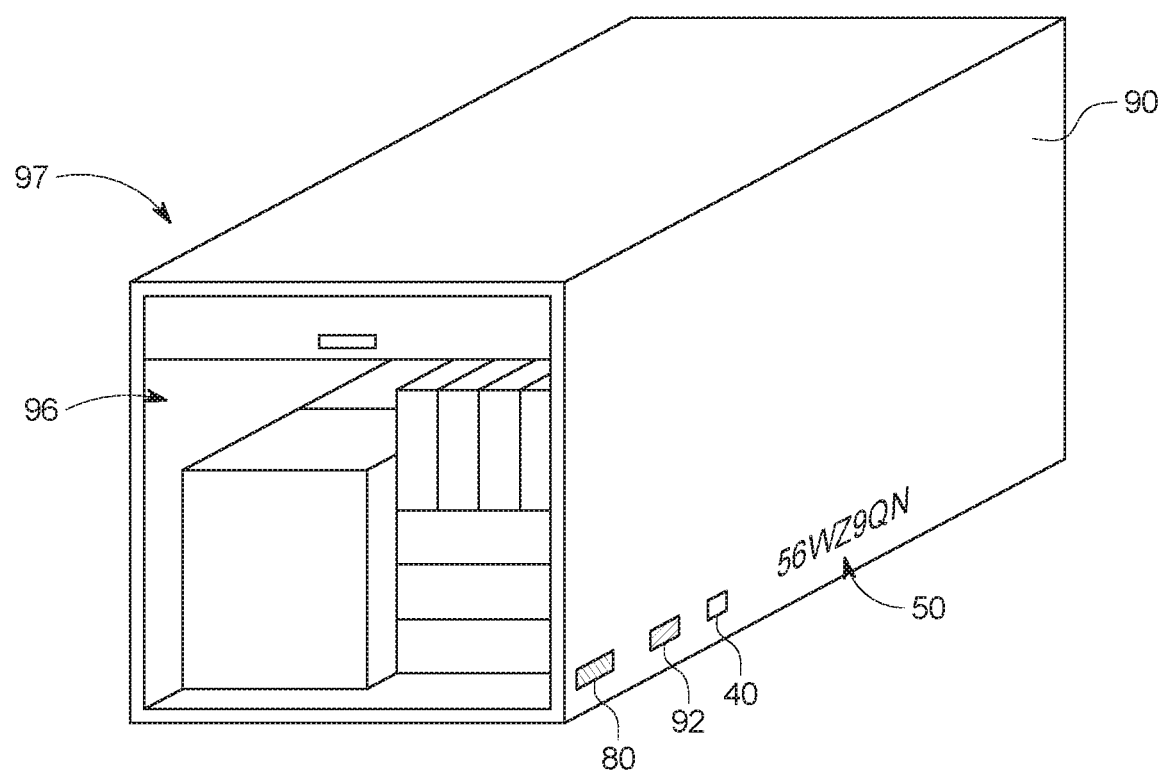
FIG. 6 is a perspective view of an as-loaded container according to an embodiment of the disclosure.

FIG. 3A is a perspective view of a pallet 1 during construction according to an embodiment of the disclosure. FIG. 3B is a perspective view of of a carton 3 with assigned coordinate frame 53 and local origin 51. FIG. 4 is a block diagram of a data structure (e.g., data structure 21) according to an embodiment of the disclosure used with the system of FIG. 1 and the method of FIG. 2. FIG. 5 is a perspective view of an as-constructed pallet 85 and FIG. 6 is a perspective view of an as-loaded container 97, according to an embodiment of the disclosure. Referring now to FIGS. 1-6, the method 2 (e.g., as implemented and performed using the system 6) is applied to mapping locations of the cartons 3 during construction of the pallet 1 (or loading of the container 90) with the cartons 3. The method 2 includes, for a first carton (e.g., first carton 10), assigning 41 a first identifier to the first carton 10 received for positioning in: the pallet space 5 of pallet 1, or in the container space 96 of container 90. The method 2 includes determining 42 one or more physical properties of the first carton 10.

The method 2 includes associating 44 the one or more physical properties of the first carton 10 with the first identifier (e.g., first carton 10 identifier). The method 2 includes determining 46 an as-positioned location of the first carton 10 in the pallet space 5 or in the container space 96. The method 2 includes generating 47 a three-dimensional (3D) map of the pallet space 5 or the container space 96 based on: the determined 42 one or more physical properties of the first carton 10, and the determined 46 as-positioned location of the first carton 10 in the pallet space 5 or in the container space 96.

In an embodiment, the method 2 includes, for at least a second carton (e.g., second carton 20), assigning at least a second identifier to the second carton 20 received for positioning in the pallet space 5 or in the container space 96. In the embodiment, the method 2 includes determining one of more physical properties of the second carton 20, and associating the one or more physical properties of the second carton 20 with the second identifier. In the embodiment, the method 2 includes determining an as-positioned location of the second carton 20 in the pallet space 5 or in the container space 96. In an example, generating 47 the 3D map includes generating the 3D map of the pallet space 5 or the container space 96 further based on: the determined one or more physical properties of the second carton(s) 20, the determined 46 as-positioned location of the first carton 10, and the determined as-positioned location of the second carton(s) 20. The method 2 steps of determining the as-positioned location of the second carton(s) 20 and/or generating 47 the 3D map based on the as-positioned locations of the first 10 and the at least a second 20 cartons may include determining if the cartons are positioned in the pallet space 5 or in the container space 96 in an interlocked configuration.

The one or more physical properties of the first 10 and/or second 20 carton(s) may include one or more of: an identity(ies) of, dimension(s) of, weight(s) of, and robotic manipulation capability attribute(s) of the respective carton (e.g., the first 10 and/or the at least a second 20 carton). In an example, the method 2 step of determining 42 the physical property(ies) of the first carton 10 and/or the method 2 step of determining the physical property(ies) of the second carton(s) 20 include(s) capturing (a), by sensor(s) 8, at least one image of at least a portion of the respective carton (10 and/or 20). In another example, the method 2 step(s) of determining 42 the physical property(ies) of the first carton 10 and/or determining the physical property(ies) of the second carton(s) 20 include(s) analyzing (b) the at least one image to extract the one or more physical properties of the respective carton (10 and/or 20). In yet another example, the method 2 step(s) of determining 42 the physical property(ies) of the first carton 10 and/or determining the physical property(ies) of the second carton(s) 20 include(s) receiving (c), from a transmitter device 40 positioned in or on the respective carton (10 and/or 20), signal(s) 27 encoding data including the one or more physical properties of the respective carton (10 and/or 20). In still another example, the method 2 step(s) of determining 42 the physical property(ies) of the first carton 10 and/or determining the physical property(ies) of the second carton(s) 20 include(s) decoding (d) the signal(s) 27 received from the transmitter device 40 to extract the one or more physical properties of the respective carton (10 and/or 20). In another example, the method 2 step(s) of determining 42 the physical property(ies) of the first carton 10 and/or determining the physical property(ies) of the second carton(s) 20 include(s) receiving (e), from a commissioning system 88, signal(s) 27 encoding data including the one or more physical properties of the respective carton (10 and/or 20). In yet another example, the method 2 step(s) of determining 42 the physical property(ies) of the first carton 10 and/or determining the physical property(ies) of the second carton(s) 20 include(s) decoding (f) the signal(s) 27 received from the commissioning system 88 to extract the one or more physical properties of the respective carton (10 and/or 20). In still another example, the method 2 step(s) of determining 42 the physical property(ies) of the first carton 10 and/or determining the physical property(ies) of the second carton(s) 20 include(s) any combination of the aforementioned processes (a, b, c, d, e, and/or f).

In an example, the sensor(s) 8 include at least one camera or other imaging device. In the example, the method 2 step(s) of determining 42 the physical property(ies) of the first carton 10 and/or determining the physical property(ies) of the second carton(s) 20 include(s) capturing, by the imaging sensor(s) 8, an image of at least a portion of the respective carton (e.g., 10 and/or 20). At least a portion of the respective carton (10 and/or 20) includes identifying information 50 about the respective carton (10 and/or 20). The identifying information 50 is provided in any appropriate form, for example, a barcode, QR code and the like, which are interpreted by the processor(s) 18 and/or imaging sensor(s) 8 into identifying information 50 for the carton(s) (10 and/or 20) as well as other information about the contents of the carton, for example, origin or source, expiration, nature of the goods, the number of cartons that are in a batch, fragility of the contents, and other information, which can be retrieved by a local or remote database, each of which may further constitute the physical property(ies).

In an embodiment, the method 2 step(s) of determining 42 the physical property(ies) of the first carton 10 and/or determining the physical property(ies) of the second carton(s) 20 include(s) analyzing the captured image(s) to extract the identity of the respective carton (10 and/or 20). Alternatively, or in addition, the sensor(s) 8 may include other sensor types such as RFID readers or detectors, which detect an RFID tag carried on or within the carton(s) (10 and/or 20) or the products stored in the carton(s) (10 and/or 20). In an example, the method 2 step(s) of associating 44 the physical property(ies) of the first carton 10 identifier, and/or associating the physical property(ies) of the second carton(s) 20 include(s) associating the extracted identity(ies) with the respective carton(s) (10 and/or 20) and/or its contents (e.g., with at least a second identifier for the at least a second carton 20).

In an embodiment, the method 2 step(s) of associating 44 the physical property(ies) of the first carton 10 identifier, and/or associating the second identifier and/or physical property(ies) of the second carton(s) 20 include(s) associating at least one of: the extracted identity, the extracted one or more dimensions, the extracted weight, and the extracted robotic manipulation capability attribute, of the respective carton with a respective identifier of the first and the at least a second identifier. In an embodiment, the method 2 step(s) of generating 47 the 3D map further includes generating the 3D map of the pallet space 5 or the container space 96 further based on at least one of: the extracted identity, the extracted one or more dimensions, the extracted weight, and the extracted robotic manipulation capability attribute, of the respective carton (e.g., 10 and/or 20). In an embodiment, method 2 also includes determining if the respective carton (e.g., 10 and/or 20) is capable of robotic manipulation without human intervention.

In an embodiment, the method 2 includes determining an available base plane area 70 of a base plane 60 of the pallet 1 or the container 90. In the embodiment, the method 2 includes determining a volume available for positioning a respective carton of the first 10 and the at least a second 20 carton in the pallet space 5 or in the container space 96. In the embodiment, the method 2 includes assigning a global coordinate system 12 ("pc") to the pallet space 5 or the container space 96. In an example, the global coordinate system 12 is assigned based on at least: the determined available base plane area 70, and the volume available. The global coordinate system 12 has a global origin 15 defined, or at least approximated, as a global point on the base plane 60, wherein the global point is defined as $x_{pc}=0$, $y_{pc}=0$, and $z_{pc}=0$. In the embodiment, the method 2 includes associating the assigned global coordinate system 12 to the pallet 1, or to the container 90.

Referring to FIG. 3B, the method 2 step(s) of determining 46 the as-positioned location of the first carton 10 and/or determining the as-positioned location of the at least a second carton 20, in the pallet space 5 or in the container space 96, includes assigning a coordinate frame 53 ("f") to the respective carton (e.g., 10 and/or 20). In an example, the coordinate frame 53 has a local origin 51 defined or at least approximated as a frame point on, or proximal to, an exterior surface 45 of the respective carton (e.g., 10 and/or 20), where the frame point is defined as $x_f=0$, $y_f=0$, and $z_f=0$. In this case, the method 2 may include determining an effective volume 75 of the respective carton (e.g., 10 and/or 20) relative to the at least one assigned coordinate frame 53 ("f"). In such embodiments, the method 2 may also include determining, for a respective as-positioned carton (e.g., 10 and/or 20), frame coordinates of the local origin 51 of the respective carton (10 and/or 20) in the assigned global coordinate system 12 of the pallet space 5 or the container space 96.

In the embodiment, the method 2 step of generating 47 the 3D map may additionally include associating the determined effective volume 75 of the respective carton (10 and/or 20) and the determined local origin 51 with an unavailable fractional volume of the pallet space 5 or the container space 96. In this case, the unavailable fractional volume of the pallet space 5 or in the container space 96 may correspond to the as-positioned location of the respective carton (10 and/or 20) in the pallet space 5 or in the container space 96. In these embodiments, the method 2 may also include the step of determining an available position for a subsequent carton 3 (e.g., third carton 30) in the pallet space 5 or in the container space 96 based on the unavailable fractional volume of the pallet space 5 or the container space 96.

In an embodiment, the method 2 step of generating 47 the 3D map of the pallet space 5 or the container space 96 includes first mapping the first carton 10 to a first position in the pallet space 5 or the container space 96. In an example, the first carton 10 is first mapped to the first position based on at least one of: the associated extracted identity, the associated extracted one or more dimensions, the associated extracted weight, and the associated extracted robotic manipulation capability attribute, of the first carton 10. In the embodiment, the method 2 may also include second mapping the at least a second carton 20 to a second position in the pallet space 5 or the container space 96. The second mapping of the second carton(s) 20 to the second position may be performed in method 2 either instead of, or in addition to, the first mapping of the first carton 10 to the first position. In an example, the second carton(s) 20 is/are second mapped to the second position based on at least one of: the associated extracted identity, the associated extracted one or more dimensions, the associated extracted weight, and the associated extracted robotic manipulation capability attribute, of the at least a second carton 20. In the embodiment, the method 2 may further include the step of updating the generated 47 3D map of the pallet space 5 or the container space 96 for a subsequent carton (e.g., third carton 30) positioned in a subsequent location in the pallet space 5 or the container space 96 based on at least one of: an associated extracted identity, an associated extracted one or more dimensions, an associated extracted weight, and an associated extracted robotic manipulation capability attribute, of the subsequent carton.

In an embodiment, the method 2 also includes assigning an identifier to the pallet 1 or to the container 90, and associating the generated 47 3D map with the identifier of an as-constructed pallet 85 or an as-loaded container 97. In the embodiment, the method 2 may further include determining an unloading protocol for the as-constructed pallet 85 or the as-loaded container 97. In an example, the method 2 step of associating the generated 47 3D map with the as-constructed pallet 85 or the as-loaded container 97 includes storing the generated 47 3D map of the pallet space 5 or the container space 96 in the memory device 17 in association with the determined unloading protocol of the as-constructed pallet 85 or the as-loaded container 97. In the embodiment, the method 2 may also include transmitting the generated 47 3D map of the pallet space 5 or the container space 96 to a receiving facility for the as-constructed pallet 85 or the as-loaded container 97.

In the embodiment, the method 2 may include determining a loading protocol for a plurality of as-constructed pallets 85 or a plurality of as-loaded containers 97 for placement on a freight delivery mode. The freight delivery mode includes one or more of a truck, a van, a tractor-trailer, a freight train, an airplane, a space vehicle, a tug boat, a barge, and a container ship. In an example, the method 2 step of associating the generated 47 3D map with the as-constructed pallet 85 or the as-loaded container 97 may include associating each of a plurality of generated 47 3D maps with each of the plurality of as-constructed pallets 85 or as-loaded containers 97. In the example, the method 2 may also include storing the generated 47 3D maps of each of a plurality of pallet spaces 5 or container spaces 96 of each of the plurality of as-constructed pallets 85 or as-loaded containers 97, respectively, in the memory device 17 in association with the determined loading protocols of the plurality as-constructed pallets 85 or as-loaded containers 97. In the embodiment, the method 2 may additionally include the step of transmitting the generated 47 3D maps of each of the plurality of pallet spaces 5 or container spaces 96 to the freight delivery mode.

To further illustrate aspects of the embodiments described above, the following use cases are presented and discussed below with reference to FIGS. 1-6.

Example 1

Referring to FIGS. 1-6, in the first use case, the pallet 1 (or the container 90) is constructed in the loading area 29 of the facility 25. The sensor(s) 8 have a line of sight 9 with the first carton 10 to be positioned on the pallet 1 (or the container 90). The sensors 8 include a camera or other imaging device or computer vision device, which captures one or more images or acquires other information of at least a portion of the first carton 10 that includes identifying information 50. As shown in FIG. 3A, the identifying information 50 is text (the word "BOX") printed or otherwise present (e.g., a label) on the exterior surface 45 of the first carton 10. Prior to or after the first carton 10 is positioned on the pallet 1 (or the container 90), the sensor 8 captures one or more images of the word "box" and transmits the image data to the processor 18. The processor 18 analyzes the capture image(s) including the identifying information 50 using a text recognition algorithm for image processing. The illustrated example in FIG. 3A shows the word "BOX" in English. The processor 18 may be programmed to use text recognition algorithms for image processing for images containing words in languages other than English. The processor 18 analyzes the captured image(s) to extract the identity of the first carton 10. For analyzing the captured image(s) to extract the identity of the first carton 10, the processor 18 runs program instructions stored as software 16 in an identity determining module 62. Upon extracting the identity of the first carton 10 as "BOX," the processor 18 associates 44 the extracted identity, along with additional determined 42 physical property(ies), with the first carton 10 identifier, and transmits the identity and physical property(ies) of the first carton 10 to the data structure 21 for storing in memory device 17 as $ID_1$ for the first carton 10.

The sensors 8 include a bar code reader, which scans bar codes 80 printed or otherwise present (e.g., as a label) on at least a portion of the second carton 20 on the exterior surface 45 thereof. The bar code 80 includes identifying information 50 for and about the second carton 20. Prior to or after the second carton 20 is positioned on the pallet 1 (or the container 90), the sensor 8 scans the bar code 80 and transmits the data encoded thereby to the processor 18. The processor 18 analyzes the bar code 80 data including the identifying information 50 using a bar code 80 decoding algorithm. The processor 18 analyzes the scanned bar code 80 to extract the identity of the second carton 20. For analyzing the scanned bar code 80 to extract the identity of the second carton 20, the processor 18 runs program instructions stored as software 16 in the identity determining module 62. Upon extracting the identity of the second carton 20 as "CAN," the processor 18 associates the extracted identity, along with additional determined physical property(ies), with the second carton 20 and transmits the identity and physical property(ies) of the second carton 20 to the data structure 21 for storing in memory device 17 as $ID_2$ for the second carton 20.

The sensors 8 include a QR code reader, which scans QR (quick response) codes 92 printed or otherwise present (e.g., as a label) on at least a portion of the third carton 30 on the exterior surface 45 thereof. The QR code 92 includes identifying information 50 for and about the third carton 30. Prior to or after the third carton 30 is positioned on the pallet 1 (or the container 90), the sensor 8 scans the QR code 92 and transmits the data encoded thereby to the processor 18. The processor 18 analyzes the QR code 92 data including the identifying information 50 using a QR code 92 decoding algorithm. The processor 18 analyzes the scanned QR code 92 to extract the identity of the third carton 30. For analyzing the scanned QR code 92 to extract the identity of the third carton 30, the processor 18 runs program instructions stored as software 16 in the identity determining module 62. Upon extracting the identity of the third carton 30 as a chair, the processor 18 associates the extracted identity, along with additional determined physical property(ies), with the third carton 30 and transmits the identity and physical property(ies) of the third carton 30 to the data structure 21 for storing in memory device 17 as $ID_3$ for the second carton 20.

For cases where the QR code 92 is obscured from the sensor 8 line of sight 9 or where the QR code 92 is obliterated or otherwise unreadable, the camera or other imaging sensor 8 captures one or more images of at least a portion of the third carton 30 that includes identifying information 50. This identifying information 50 is in the form or an image such as a photograph, graphical artwork, and the like, that is printed or otherwise present (e.g., as a label) on the exterior surface 45 of the third carton 30. As shown in FIG. 3A, the identifying information 50 is a picture of a chair. Prior to or after the third carton 30 is positioned on the pallet 1 (or the container 90), the sensor 8 captures one or more images of the picture of the chair and transmits the image data to the processor 18. The processor 18 analyzes the captured image(s) including the identifying information 50 using an image recognition algorithm for image processing. The processor 18 analyzes the captured image(s) to extract the identity of the third carton 30. For analyzing the captured image(s) to extract the identity of the third carton 30, the processor 18 runs program instructions stored as software 16 in the identity determining module 62. Upon extracting the identity of the third carton 30 as a chair, the processor 18 associates the extracted identity, along with additional determined physical property(ies), with the third carton 30 and transmits the identity and physical property(ies) of the third carton 30 to the data structure 21 for storing in memory device 17 as $ID_3$ for the third carton 30.

In an example, the sensor(s) 8 include at least one receiver, including, without limitation, an antenna for receiving a signal from a transmitter device 40 positioned inside or on an exterior surface 45 of the respective carton (10 and/or 20). In the example, method 2 includes receiving (e.g., by the processor 18 by way of the sensor(s) 8) one or more signals encoding the identifying information 50 and physical property(ies) for the respective carton (10 and/or 20). In the example, the method 2 step(s) of associating 44 the physical property(ies) of the first carton 10 with the first identifier and/or associating the physical property(ies) of the second carton(s) 20 with the second identifier(s) include(s) decoding the received signal(s) to extract the identity and physical property(ies) of the respective carton (10 and/or 20). In the example, the method 2 step(s) of associating 44 the physical property(ies) of the first carton 10 with the first identifier and/or associating the physical property(ies) of the second carton(s) 20 with the second identifier(s) include(s) includes associating the extracted identity with the respective carton (10 and/or 20). Based on this example, a second use case is discussed below with reference to FIGS. 1-6.

Example 2

Referring to FIGS. 1-6, in the second use case, the pallet 1 (or the container 90) is constructed in the loading area 29 of the facility 25. The sensors 8 have a line of sight 9 with the first carton 10 to be positioned on the pallet 1 (or the container 90). The sensors 8 include a receiver, which receive signals from a transmitter device 40 positioned inside the first carton 10 or on the exterior surface 45 thereof. The transmitter device 40 transmits an RFID (radio frequency identification) signal that encodes identifying information 50 for and about the first carton 10. Prior to or after the first carton 10 is positioned on the pallet 1 (or the container 90), the sensor 8 receiving the RFID signal from the transmitter device 40 and transmits the RFID data to the processor 18. The processor 18 analyzes the received RFID data including the identifying information 50 using an RFID signal-decoding algorithm. The processor 18 analyzes the received RFID data to extract the identity of the first carton 10. For analyzing the received RFID data to extract the identity of the first carton 10, the processor 18 runs program instructions stored as software 16 in an identity determining module 62. Upon extracting the identity of the first carton 10 as a box, the processor 18 associates 44 the extracted identity physical property(ies) with the first carton 10 identifier and transmits the identity and physical properties of the first carton 10 to the data structure 21 for storing in memory device 17 as $ID_1$ for the first carton 10.

In an example, the computing device 4 and/or the server 11 is operably coupled in communication with a commissioning system 88. In the example, the method 2 step(s) of determining 42 the physical property(ies) of the first carton 10 and/or determining the physical property(ies) of the second carton(s) 20 include(s) receiving information about the respective carton (10 and/or 20) from the commissioning system 88. The information about the respective cartons 3 is transmitted by the commissioning system 88 and received by user 7, client device 23, server 11, and/or processor 18 on a carton-by-carton basis and in a sequential order corresponding to the order in which the respective cartons 3 are to be positioned on the pallet 1 (or the container 90). Alternatively, the information about the respective cartons 3 may be transmitted by the commissioning system 88 and received by user 7, client device 23, server 11, and/or processor 18 in bulk for all cartons 3 to be positioned on the pallet 1 (or the container 90). This bulk data set may be sequentially ordered for the order in which respective cartons 3 are to be positioned on the pallet 1 (or the container 90). In the example, the method 2 step(s) of determining 42 the physical property(ies) of the first carton 10 and/or determining the physical property(ies) of the second carton(s) 20 include(s) determining the identity and physical property(ies) of the respective carton (10 and/or 20) based at least in part on the information received from the commissioning system 88. Based on this example, a third use case is discussed below with reference to FIGS. 1-6.

Example 3

Referring to FIGS. 1-6, in the third use case, the pallet 1 (or the container 90) is constructed in the loading area 29 of the facility 25. An operator in the facility 25 is in communication with the commissioning system 88. The operator is a user 7 of system 6. In this case, the user 7 includes a human being or an autonomous or semi-autonomous robotic and/or artificial intelligence system. The user 7 receives information about the first carton 10 from the commissioning system 88. In the case of a human user 7, the commissioning system 88 transmits the first carton 10 information to the client device 23. In the case of the robotic system user 7, the commissioning system 88 transmits the first carton 10 information to the robotic system either directly or indirectly (e.g., via the server 11, the client device 23, and/or the communication interface 24). The first carton 10 information received from the commissioning system 88 includes identifying information 50 and physical properties about the first carton 10. The first carton 10 information received from the commissioning system 88 includes a time/date stamp for when the first carton 10 information was received by the user 7 in facility 25. Upon receipt of the first carton 10 information from the commissioning system 88, the user 7 transmits the first carton 10 information to the processor 18 via the communication interface 24. Processor(s) 18 assign 41 the first identifier to the first carton 10. Prior to or after the first carton 10 is positioned on the pallet 1 (or the container 90), the processor 18 receiving the first carton 10 information directly (e.g., transmitted from the commissioning system 88 directly to the processor 18) or indirectly (e.g., transmitted from the commissioning system 88 to the client device 23 and/or the server 11 first, and then transmitted to the processor 18) performs any necessary analysis on the received first carton 10 information and physical property(ies). For instance, the first carton 10 information including identifying information 50 and physical property(ies) received from the commissioning system 88 is encoded, and the processor 18 decodes the received first carton 10 information using an RFID signal-decoding algorithm. The processor 18 analyzes the received first carton 10 information including identifying information 50 and physical property(ies) from the commissioning system 88 to extract the identity and physical property(ies) of the first carton 10. For analyzing the received data to extract the identity of the first carton 10 and/or determine 42 the identity and physical property(ies) of the first carton 10 based at least in part on the first carton 10 information received from the commissioning system 88, the processor 18 runs program instructions stored as software 16 in the identity determining module 62. Upon extracting the identity and physical property(ies) of the first carton 10 as a box, the processor 18 associates 44 the extracted identity data with the first carton 10 identifier and transmits the identity and physical property(ies) of the first carton 10 to the data structure 21 for storing in memory device 17 as $ID_1$ for the first carton 10.

At a time occurring after the user 7 received the information from the commissioning system 88 for and about the first carton 10 from the commissioning system 88, the user 7 receives information about the second carton 20 from the commissioning system 88. The second carton 20 information received from the commissioning system 88 includes identifying information 50 and physical property(ies) about the second carton 20. The second carton 20 information received from the commissioning system 88 includes a time/date stamp for when the second carton 20 information was received by the user 7 in facility 25. In the third use case, the first carton 10 is positioned on the pallet 1 (or the container 90) before the second carton 20. Thus, the sequence with which information for and about the respective cartons (10 and/or 20) is received from the commissioning system 88 corresponds to the sequence with which the respective cartons (e.g., first carton 10, second carton 20, third carton 30, . . . (n−1)-th carton, n-th carton) are positioned on the pallet 1 (or the container 90). Processor(s) 18 assign the second identifier(s) to the second carton(s) 20. Prior to or after the second carton 20 is positioned on the pallet 1 (or the container 90), the processor 18 receiving the second carton 20 information performs any necessary analysis to extract the identity of the second carton 20 and/or determine the identity of the second carton 20 based at least in part on the first carton 10 information and physical property(ies) received from the commissioning system 88. To extract the identity of the second carton 20 and/or determine the identity of the second carton 20, the processor 18 runs program instructions stored as software 16 in the identity determining module 62. Upon extracting the identity of the second carton 20 as a can, the processor 18 associates the extracted identity data with the second carton 20 and transmits the identity and physical property(ies) of the second carton 20 to the data structure 21 for storing in memory device 17 as $ID_2$ for the second carton 20.

The commissioning system 88 continues to transmit information including identifying information 50 for any subsequent cartons to be positioned on the pallet 1 (or the container 90) in like manner as described above for the first 10 and the second 20 cartons. The processor 18 receives the respective carton information directly or indirectly from the commissioning system 88 and extracts and/or determines the identities of the respective cartons 3, including by performing any needed analysis by running program instructions stored as software 16 in the identity determining module 62. Processor(s) assign subsequent identifier(s) to the received subsequent cartons. Upon extracting the identity of the final (the n-th) carton to be positioned on the pallet 1 (or the container 90), the processor 18 associates the extracted identity data and physical property(ies) with the n-th carton and transmits the identity and physical property(ies) of the n-th carton to the data structure 21 for storing in memory device 17 as $ID_n$ for the n-th carton.

In an example, the method 2 includes determining an orientation attribute of at least one of: the first carton 10, and the at least a second carton 20. The orientation attributes include the positional status of the respective carton (10 and/or 20) being right side up, lying on its side, or upside-down. Determining the orientation attribute includes determining an orientation of symbols of the identifying information 50 for the respective carton. Determining the orientation attribute includes receiving information for the orientation attribute from the commissioning system 88 and determining the orientation attribute for the respective carton (10 and/or 20) based at least in part on the information received from the commissioning system 88. Based on this example, a fourth use case is discussed below with reference to FIGS. 1-6.

Example 4

Referring to FIGS. 1-6, in the fourth use case, the camera- or other imaging device-type sensor 8 captures image(s) of at least a portion of the second carton 20 either before or after the second carton 20 is positioned on the pallet 1 (or the container 90). This image data is transmitted to the processor 18. The processor 18 analyzes the captured image to determine an orientation attribute of the second carton 20. For determining the orientation attribute of the second carton 20, the processor 18 runs program instructions stored as software 16 in the attribute determining module 63. The processor 18 determines the orientation attribute of the second carton 20 by performing image-processing analysis capable of determining an orientation of symbols of the identifying information 50 printed or otherwise present on the exterior surface 45 of the second carton 20. As shown in FIG. 3A, the identifying information 50 for and about the second carton 20 is the word "CAN." The processor 18 determines that the orientation of the letters in "CAN" is upside down and thus determines that the orientation attribute of the second carton 20 is likewise upside down. Upon determining the orientation attribute of the second carton 20 as upside down, the processor 18 associates the determined orientation attribute data with the second carton 20 and transmits the orientation attribute of the second carton 20 to the data structure 21 for storing in memory device 17 as a $VALUE_2$ for the second carton 20.

In an example, the method 2 includes determining a shape attribute of at least one of: the first carton 10, and the at least a second carton 20. The determined shape attributes include the relative arrangements of faces of the exterior surface 45 of the respective carton (10 and/or 20) relative one another. For instance, the respective carton (10 and/or 20) has a determined shape attribute of one of: a square cubic shape, a rectangular cubic shape, a polyhedral shape, a cylindrical shape, and other 3D shapes. In an example, the method 2 includes determining at least one dimension attribute of at least one of: the first carton 10, and the at least a second carton 20. For a respective carton (10 and/or 20) having a rectangular cubic shape, for instance, the determined dimension attributes include the values for length, width, and height of the respective carton (10 and/or 20). For a respective carton (10 and/or 20) having a cylindrical shape, for example, the determined dimension attributes include the values for height and base diameter of the respective carton (10 and/or 20). In an example, the method 2 includes determining an effective volume 75 of at least one of: the first carton 10, and the at least a second carton 20. For a respective carton (10 and/or 20) having a rectangular cubic shape, for instance, the determined effective volume 75 is computed by processor 18 as the product of the determined values for length, width, and height of the respective carton (10 and/or 20). For a respective carton (10 and/or 20) having a cylindrical shape, for example, the determined effective volume 75 is computed by the processor 18 based on an approximation of the cylindrical carton (10 and/or 20) as a rectangular cubic shape, where the cylinder base is approximated as a square having side length equal to the determined base diameter. In an example, the method 2 includes determining a weight attribute of at least one of: the first carton 10, and the at least a second carton 20. In an example, determining at least one of: the shape attribute, dimension attribute(s), effective volume 75, and the weight attribute, of at least one of: the first carton 10, and the at least a second carton 20 includes receiving information from the commissioning system 88 and determining the respective attribute for the respective carton (10 and/or 20) based at least in part on the information received from the commissioning system 88. Based on these examples, a fifth use case is discussed below with reference to FIGS. 1-6.

Example 5

Referring to FIGS. 1-6, in the fifth use case, the pallet 1 (or the container 90) is constructed in the loading area 29 of the facility 25. The sensors 8 include a camera or other imaging device having a line of sight 9 with the first carton 10 to be positioned on the pallet 1 (or the container 90). The sensor 8 captures image(s) of at least a portion of the first carton 10 either before or after the first carton 10 is positioned on the pallet 1 (or the container 90). The image data is transmitted to the processor 18. The processor 18 analyzes the captured image to determine 42 a shape attribute of the first carton 10. For determining 42 the shape attribute of the first carton 10, the processor 18 runs program instructions stored as software 16 in an attribute determining module 63. Upon determining 42 the shape attribute of the first carton 10 as rectangular cubic, the processor 18 associates 44 the determined 42 shape attribute data with the first carton 10 identifier and transmits the shape attribute of the first carton 10 to the data structure 21 for storing in memory device 17 as a $VALUE_1$ for the first carton 10.

The sensors 8 include a 3D scanner having a line of sight 9 with the third carton 30 to be positioned on the pallet 1 (or the container 90). The sensor 8 scans at least a portion of the third carton 30 either before or after the third carton 30 is positioned on the pallet 1 (or the container 90). The 3D scanner sensor 8 generates a plurality of pairs of data points for the third carton 30. Each pair of data points generated by the 3D scanner includes a range from the 3D scanner sensor 8 to a point on the exterior surface 45 of the third carton 30 and an angle between the 3D scanner sensor 8 and the respective point. The 3D scanner data including the plurality of the data pairs is transmitted to the processor 18. The processor 18 analyzes the plurality of data pairs to determine a shape attribute, at least one dimensional attribute (e.g., length, width, height), and/or an effective volume 75 attribute of the third carton 30. For determining the shape attribute, the at least one dimensional attribute (e.g., length, width, height), and/or the effective volume 75 attribute of the third carton 30, the processor 18 runs program instructions stored as software 16 in an attribute determining module 63. Upon determining the shape and dimensional attributes of the third carton 30 as a square cube with side length 140 cm and an effective volume 75 of $2.744 \times 10^3$ cm$^3$, the processor 18 associates the determined shape, dimensional, and effective volume 75 attribute data with the third carton 30. The processor 18 transmits the shape, dimensional, and effective volume 75 attribute data of the third carton 30 to the data structure 21 for storing in memory device 17 as VALUES$_3$ for the third carton 30.

The sensors 8 include a scale for determining a weight of the pallet 1 (or the container 90) and its contents (e.g., cartons 3). The scale sensor 8 is positioned in the loading area 29 of the facility 25 and is tared to zero using the pallet 1 (or container 90) to be loaded. The first 10, second 20, and third 30 cartons are positioned on the pallet 1 (or the container 90) and for each of them, the scale sensor 8 determines their weight attributes as 120 kg, 34 kg, and 95 kg, respectively. For each of the respective cartons 3 from the first carton 10 to the final (n-th) carton positioned on the pallet 1 (or the container 90), the scale sensor 8 transmits the respective weight values or the signals encoding them to the processor 18. For determining the weight attribute, the processor 18 runs program instructions stored as software 16 in an attribute determining module 63. Upon determining the weight attributes of the respective cartons 3 positioned on the pallet 1 (or the container 90), the processor 18 associates the determined weight attribute with the respective carton 3 and transmits the weight attribute data to the data structure 21 for storing in memory device 17 as VALUE$_1$, . . . , VALUE$_{n-1}$, VALUE$_n$, for the respective cartons 3.

In an example, the method 2 includes determining a robotic manipulation capability attribute of at least one of: the first carton 10, and the at least a second carton 20. In the example, determining the robotic manipulation capability attribute of the respective carton (10 and/or 20) includes determining if the respective carton (10 and/or 20) is capable of robotic manipulation without human intervention. In an example, determining at least one of: the robotic manipulation capability attribute of the respective carton (10 and/or 20), and determining if the respective carton (10 and/or 20) is capable of robotic manipulation without human intervention, includes receiving information from the commissioning system 88 and determining the respective attribute for the respective carton (10 and/or 20) based at least in part on the information received from the commissioning system 88. Based on these examples, a sixth use case is discussed below with reference to FIGS. 1-6.

Example 6

Referring to FIGS. 1-6, in the sixth use case, the processor 18 determines 42 whether or not the first carton 10 of the fifth use case is capable of robotic manipulation, either with (semi-autonomous) or without (autonomous) human intervention (e.g., a robotic manipulation capability attribute for the respective cartons 3). The weight attribute of the as- positioned first carton 10 is determined 42 to be 120 kg and the available robotic system is only used for lifting, moving, and otherwise manipulating cartons 3 weighing no more than 105 kg. Thus, based on the determined 42 weight attribute for the first carton 10, the processor 18 determines 42 that the first carton 10 is not capable of either robotic manipulation with human intervention or robotic manipulation without human intervention. For determining 42 the shape attribute, the at least one dimensional attribute (e.g., length, width, height), and/or the effective volume 75 attribute of the third carton 30, the processor 18 runs program instructions stored as software 16 in the attribute determining module 63. Upon determining 42 the robotic manipulation capability attribute for the first carton 10 as not capable either with or without human intervention, the processor 18 associates 44 the determined 42 robotic manipulation capability attribute data with the first carton 10 identifier and transmits the robotic manipulation capability attribute data of the first carton 10 to the data structure 21 for storing in memory device 17 as a VALUE$_1$ for the first carton 10.

For the second carton 20, the processor 18 reads the orientation attribute data (e.g., determined in the fourth use case) from data structure 21 for the second carton 20 (e.g., from VALUES$_2$). Processor 18 runs program instructions stored as software 16 in the attribute determining module 63 and determines, based on the determined orientation attribute of upside-down for the second carton 20, that the second carton 20 is capable of robotic manipulation, but only with human intervention. In the facility 25, the robotic systems require that cartons 3 have orientation attributes of right side up for manipulation. Otherwise, the robotic systems require that a human being (e.g., a human user 7) re-orient the respective carton 3 to the right-side up orientation before being robotically manipulated.

For the third carton 30, the processor 18 receives image data from camera- or other imaging device-type sensor(s) 8, which capture image(s) of portions of the third carton 30 proximate the base plane 60 of the pallet 1 (or the container 90). As shown in FIG. 3A, the third carton 30 includes a carton stand positioned between the third carton 30 and the base plane 60 of the pallet 1 (or the container 90). The carton stand facilitates lifting, movement, or otherwise being manipulated by a robotic system in the facility 25. In this case, cartons 3 that have the carton stand associated therewith are definitively capable of being manipulated by robotic systems without human intervention. Prior to or after the third carton 30 is positioned on the pallet 1 (or the container 90), the sensor 8 captures one or more images of the third carton 30 including portion(s) thereof also showing the carton stand of the third carton 30 in the image(s). The processor 18 analyzes the capture image(s) including the carton stand using an image recognition algorithm for image processing. The processor 18 analyzes the captured image(s) to determine the presence of the carton stand (not shown in FIG. 3A) for the third carton 30. For analyzing the captured image(s) to determine the presence of the carton stand for the third carton 30, the processor 18 runs program instructions stored as software 16 in the attribute determining module 63. Based at least in part on determining the presence of the carton stand for the third carton 30 in the captured image(s), the processor 18 determines that the robotic manipulation capability attribute of the third carton 30 is capable of robotic manipulation without human intervention. Upon determining that the robotic manipulation capability attribute of the third carton 30 is capable of robotic manipulation without human intervention, the processor 18 associates the determined robotic manipulation capability attribute with the third carton 30. The processor 18 transmits the robotic manipulation capability attribute of the third carton 30 to the data structure 21 for storing in memory device 17 as a VALUE$_3$ for the third carton 30.

In an example, the method 2 includes determining an available base plane area 70 of a base plane 60 of the pallet 1 (or the container 90). In the example, the method 2 includes assigning, based on at least the determined available base plane area 70, a global coordinate system (pc) 12 to the pallet space 5 (or the container space 96). In the example, the global coordinate system 12 has a global origin 15 defined or at least approximated as a point $x_{pc}=0$, $y_{pc}=0$, and $z_{pc}=0$ on the base plane 60 of the pallet 1 (or the container 90). In the example, the method 2 includes determining a location of the global origin 15 in the pallet space 5 (or the container space 96). In the example, the method 2 includes associating the assigned global coordinate system 12 to the pallet 1 (or the container 90).

In the present example, at least one of the steps of: determining 46 the as-positioned location of the first carton 10 in the pallet space 5 (or in the container space 96), and determining the as-positioned location of the at least a second carton 20 in the pallet space 5 (or in the container space 96), includes assigning at least one point (e.g., a first 13 and at least a second 22 point for the first 10 and the at least a second 20 cartons) on or proximal to the exterior surface 45 of the respective carton (10 and/or 20). In this case, the first 13 and second 22 points function in the method 2 as local origins 51. In this example, at least one of these determining steps includes determining the effective volume 75 of the respective carton (10 and/or 20) relative to the assigned point (13 and/or 22). In this example, at least one of these determining steps includes determining, for the respective as-positioned carton (10 and/or 20), the coordinates of the assigned point (13 and/or 22) of the respective carton (10 and/or 20) in the assigned global coordinate system 12 of the pallet space 5 (or the container space 96). The effective volume 75 of the carton (10 and/or 20) is determined with reference to the assigned coordinate frame 53. In this example, method includes associating the at least one assigned point (13 and/or 22) and the determined effective volume 75 of the respective carton (10 and/or 20) with an unavailable fractional volume of the pallet space 5 (or the container space 96).

In the example, determining 46 the as-positioned location of the first carton 10 in the pallet space 5 (or in the container space 96) includes assigning the point 13 on the exterior surface 45 of the first carton 10. In this case, point 13 functions in method 2 as the local origin 51. In this example, determining 46 the as-positioned location of the first carton 10 in the pallet space 5 (or in the container space 96) includes determining the effective volume 75 of the first carton 10 relative to its assigned point 13. In this example, determining 46 the as-positioned location of the first carton 10 in the pallet space 5 (or in the container space 96) includes determining, for the as-positioned first carton 10, the coordinates of its assigned point 13 in the assigned global coordinate system 12 of the pallet space 5 (or the container space 96) relative to the global origin 15. In this example, determining 46 the as-positioned location of the first carton 10 in the pallet space 5 (or in the container space 96) includes associating the assigned point 13 and the determined effective volume 75 of the first carton 10 with a first unavailable fractional volume of the pallet space 5 (or the container space 96). In this example, determining 46 the as-positioned location of the first carton 10 in the pallet space 5 (or in the container space 96) includes assigning the first unavailable fractional volume to the generated 47 3D map of the pallet space 5 (or the container space 96), where the assigned first unavailable fractional volume corresponds to the as-positioned location of the first carton 10 in the pallet space 5 (or the container space 96). In this example, the method 2 includes determining one or more available positions for the at least a second carton 20 in the pallet space 5 (or the container space 96) based at least on part on the assigned first unavailable fractional volume of the first carton 10 in the pallet space 5 (or the container space 96).

In the present example, determining the as-positioned location of the at least a second carton 20 in the pallet space 5 (or in the container space 96) includes assigning the point 22 on the exterior surface 45 of the at least a second carton 20. In this example, determining the as-positioned location of the at least a second carton 20 in the pallet space 5 (or in the container space 96) includes determining the effective volume 75 of the at least a second carton 20 relative to its assigned point 22. In this example, determining the as-positioned location of the at least a second carton 20 in the pallet space 5 (or in the container space 96) includes determining, for the as-positioned at least a second carton 20, the coordinates of its assigned point 22 in the assigned global coordinate system 12 of the pallet space 5 (or the container space 96) relative to the global origin 15. In this example, determining the as-positioned location of the at least a second carton 20 in the pallet space 5 (or in the container space 96) includes associating the assigned point 22 and the determined effective volume 75 of the at least a second carton 20 with at least a second unavailable fractional volume of the pallet space 5 (or the container space 96). In this example, determining the as-positioned location of the at least a second carton 20 in the pallet space 5 (or in the container space 96) includes assigning the at least a second unavailable fractional volume to the generated 47 3D map of the pallet space 5 (or the container space 96), where the assigned at least a second unavailable fractional volume corresponds to the as-positioned location of the at least a second carton 20 in the pallet space 5 (or the container space 96). Based on these examples, a seventh use case is discussed below with reference to FIGS. 1-6.

Example 7

Referring to FIGS. 1-6, in the seventh use case, the sensors 8 include a camera- or other imaging device-type sensor 8 in line of sight 9 with the first carton 10. Before or during the positioning of the first carton 10 on the pallet 1 (or the container 90), the sensor 8 captures image(s) of at least a portion of the exterior surface 45 of the first carton 10 and transmits the captured image(s) to the processor 18. The processor 18 performs image-processing analysis on image(s) of at least a portion of the exterior surface 45 of the first carton 10 to assign a first point 13 thereupon, which function in method 2 as the local origin 51. In the case of the image processing analysis performed by processor 18 on the captured images of the first carton 10 both during and after the first carton 10 is positioned on the pallet 1 (or the container 90)—e.g., while the first carton 10 is in transit to and/or in the process of being positioned on the pallet 1 (or the container 90)—the image processing performed by the processor 18 includes tracking the assigned first point 13 through until the first carton 10 is positioned on the pallet 1 (or the container 90). In the example illustrated in FIG. 3A, the image processing analysis by the processor 18 locates a marking 82 printed or otherwise present on the exterior surface 45 of the first carton 10, which uniquely identifies its position as the first point 13. To assign and/or track the first point 13 of the first carton 10, the processor 18 runs program instructions stored as software 16 in a location determining module 64.

With the first point 13 assigned to the first carton 10, the processor 18 determines the effective volume 75 of the first carton 10 relative to the assigned first point 13 (e.g., including, without limitation, using the processing described above with reference to the fifth use case). Upon determining the effective volume 75 attribute of the first carton 10 relative to the assigned first point 13, the processor 18 associates 44 the determined effective volume 75 attribute data with the first carton 10 identifier and transmits the effective volume 75 attribute data of the first carton 10 to the data structure 21 for storing in memory device 17 as $VALUE_1$ for the first carton 10.

Before, after, or substantially simultaneously with the processor 18 determining the effective volume 75 attribute of the first carton 10 relative to the assigned first point 13, the processor 18 determines the coordinates (e.g., $x_1$, $y_1$, $z_1$) of the assigned first point 13 in the assigned global coordinate system 12 in the pallet space 5 (of the container space 96). In the example shown in FIG. 3A, for the pallet 1 having a square base plane 60 with side length of 2 m, and with the first carton 10 positioned on the pallet 1 in contact with the base plane 60, the processor 18 determines that the coordinates of the first point 13 are ($x_{pc1}$=1.3 m, $y_{pc1}$=1.4 m, $z_{pc1}$=0 m). To determine the coordinates of the assigned first point 13 in the assigned global coordinate system 12 in the pallet space 5 (of the container space 96), the processor 18 runs program instructions stored as software 16 in the location determining module 64. The processor 18 associates the assigned first point 13 and the determined effective volume 75 attribute data of the as-positioned first carton 10 with a first unavailable volume of the pallet space 5 (or the container space 96). To define the first unavailable volume for the first carton 10, the processor 18 assigns one or more additional points to the exterior surface 45 of the first carton 10 in addition to the assigned first point 13. For the first carton 10, the determined as-positioned location of the first carton 10 in the pallet space 5 (or the container space 96) is thus defined by the first point 13 coordinates and the determined first unavailable fractional volume with its one or more additional points assigned to the exterior surface 45. The processor 18 assigns the determined first unavailable fractional volume to the generated 47 3D map of the pallet space 5 (or the container space 96), where the assigned first unavailable fractional volume corresponds to the as-positioned location of the first carton 10 in the pallet space 5 (or the container space 96). The processor 18 transmits the determined first point 13 coordinates data and the determined first unavailable volume of the first carton 10 to the data structure 21 for storing in memory device 17 as $LOC_1$ for the first carton 10.

Before or during the positioning of the at least a second carton 20 on the pallet 1 (or the container 90), the processor 18 determines one or more available positions for the at least a second carton 20 in the pallet space 5 (or the container space 96) based at least on part on the assigned first unavailable fractional volume of the first carton 10 in the pallet space 5 (or the container space 96). To determine the one or more available positions for the at least a second carton 20 in the pallet space 5 (or the container space 96), the processor 18 runs program instructions stored as software 16 in an available position determining module 69.

Before or during the positioning of the second carton 20 on the pallet 1 (or the container 90), the sensor 8 captures image(s) of at least a portion of the exterior surface 45 of the second carton 20 and transmits the captured image(s) to the processor 18. The processor 18 performs image-processing analysis on image(s) of at least a portion of the exterior surface 45 of the second carton 20 and determines that its shape attribute is a cylinder. In the image processing algorithm, the processor 18 approximates the cylinder base as a square having side length equal to the base diameter determined by the processor 18. For the second carton 20, the image processing performed by the processor 18 is therefore based on the cylindrically shaped second carton 20 approximated as a rectangular cubic shaped second carton 20, as shown in FIG. 3A. To determine the shape attribute and to approximate the cylinder base as a square, the processor 18 runs program instructions stored as software 16 in the attribute determining module 63.

The processor 18 assigns a second point 22 to one corner of the square-approximated base of the cylindrically shaped second carton 20 as the local origin 51, as shown in FIGS. 3A and 3B. In the case of the image processing analysis performed by processor 18 on the captured images of the second carton 20 both during and after the second carton 20 is positioned on the pallet 1 (or the container 90)—e.g., while the second carton 20 is in transit to and/or in the process of being positioned on the pallet 1 (or the container 90)—the image processing performed by the processor 18 includes tracking the assigned second point 22 through until the second carton 20 is positioned on the pallet 1 (or the container 90). To assign and/or track the second point 22 of the second carton 20, the processor 18 runs program instructions stored as software 16 in the location determining module 64.

With the second point 22 assigned to the second carton 20, the processor 18 determines the effective volume 75 of the second carton 20 relative to the assigned second point 22. In this case, the processor 18 determines the effective volume 75 attribute for the second carton 20 approximated as the rectangular cubic shaped second carton 20. Upon determining the effective volume 75 attribute of the second carton 20 relative to the assigned second point 22, the processor 18 associates the determined effective volume 75 attribute data with the second carton 20 and transmits the effective volume 75 attribute data of the second carton 20 to the data structure 21 for storing in memory device 17 as $VALUE_2$ for the second carton 20.

Before, after, or substantially simultaneously with the processor 18 determining the effective volume 75 attribute of the second carton 20 relative to the assigned second point 22, the processor 18 determines the coordinates (e.g., $x_{pc}$, $y_{pc}$, $z_{pc}$) of the second point 22 in the assigned global coordinate system 12 in the pallet space 5 (of the container space 96). In the example shown in FIG. 3A, for the pallet 1 having a square base plane 60 with side length of 2 m, and with the second carton 20 positioned on the pallet 1 atop the first carton 10, the processor 18 determines that the coordinates of the second point 22 are ($x_{pc}$=1.4 m, $y_{pc}$=1.5 m, $z_{pc}$=0.1 m). To determine the coordinates of the assigned second point 22 in the assigned global coordinate system 12 in the pallet space 5 (of the container space 96), the processor 18 runs program instructions stored as software 16 in the location determining module 64. The processor 18 associates the assigned second point 22 and the determined effective volume 75 attribute data of the as-positioned second carton 20 with at least a second unavailable fractional volume of the pallet space 5 (or the container space 96). In this case, the at least a second unavailable fractional volume of the second carton 20 is determined based on the second carton 20 approximated as a rectangular cubic shaped second carton 20. To define the at least a second unavailable fractional volume for the second carton 20, the processor 18 assigns one or more additional points (e.g., points 55 and 57, as shown in FIG. 3B) to the exterior surface 45 of the second carton 20 in addition to the assigned second point 22. For the second carton 20, the determined as-positioned location of the second carton 20 in the pallet space 5 (or the container space 96) is thus defined by the second point 22 coordinates and the determined at least a second unavailable fractional volume with its one or more additional points assigned to the exterior surface 45. The processor 18 transmits the determined second point 22 coordinates data and the determined at least a second unavailable fractional volume of the second carton 20 to the data structure 21 for storing in memory device 17 as $LOC_2$ for the second carton 20. Upon assigning the respective points and determining the respective unavailable volumes (with their one or more additional points assigned to the respective exterior surface 45), the processor 18 associates the assigned points and the determined unavailable volumes with the respective cartons 3 (e.g., third carton 30, . . . (n−1)-th carton, n-th carton). The processor 18 transmits these data to the data structure 21 for storing in memory device 17 as $LOC_1, \ldots, LOC_{n-1}, LOC_n$, for the respective cartons 3.

In the present example, determining the coordinates of the assigned point 22 for the as-positioned at least a second carton 20 in the assigned global coordinate system 12 of the pallet space 5 (or the container space 96) includes determining, for the as-positioned at least a second carton 20, the coordinates of its assigned point 22 in the assigned global coordinate system 12 of the pallet space 5 (or the container space 96) relative to the global origin 15.

In the present example, determining the coordinates of the assigned point 22 for the as-positioned at least a second carton 20 in the assigned global coordinate system 12 of the pallet space 5 (or the container space 96) includes determining, for the as-positioned at least a second carton 20, the coordinates of its assigned point 22 in the assigned global coordinate system 12 of the pallet space 5 (or the container space 96) relative to the assigned point 13 of the first carton 10. Based on these examples, an eighth use case is discussed below with reference to FIGS. 1-6.

Example 8

Referring to FIGS. 1-6, in the eighth use case, the sensor(s) 8 have a line of sight 9 with the global origin 15, and the processor 18 determines the coordinates of the assigned second point 22 (e.g., $x_{pc2}$=1.4 m, $y_{pc2}$=1.5 m, $z_{pc2}$=0.1 m, determined in the seventh use case) in the assigned global coordinate system 12 in the pallet space 5 (of the container space 96) relative to the global origin 15. To determine the coordinates of the assigned second point 22 in the assigned global coordinate system 12 in the pallet space 5 (of the container space 96) relative to the global origin 15, the processor 18 runs program instructions stored as software 16 in the location determining module 64.

For the third carton 30, the sensor(s) 8 do not have a line of sight 9 with the global origin 15. For the case of the third carton 30, the sensor(s) 8 do have a line of sight 9 with the second point 22, and the processor 18 determines the coordinates of the assigned third point 32 ($x_{pc3}$, $y_{pc3}$, $z_{pc3}$) in the assigned global coordinate system 12 in the pallet space 5 (of the container space 96) relative to the second point 22. In the case, the third point 32 functions as the local origin 51 of the third carton 30 in method 2. To determine the coordinates of the assigned third point 32 of the third carton 30 in the assigned global coordinate system 12 in the pallet space 5 (of the container space 96) relative to the second point 22, the processor 18 runs program instructions stored as software 16 in the location determining module 64. In the example shown in FIG. 3A, the processor 18 determines (e.g., based on image processing-based analysis) that the third point 32 is located 1.3 m in the negative x-direction, 1.4 m in the positive y-direction, and 0.1 m in the negative z-direction away from the second point 22. Using these data, the processor 18 determines that the coordinates of the third point 32 in the global coordinate system 12 in the pallet space 5 (or the container space 96) relative to the global origin 15 are $x_{pc3}$=0.01 m, $y_{pc3}$=0.01 m, $z_{pc3}$=0 m. The processor 18 determines the effective volume 75 attribute for the third carton 30 and the third unavailable volume for the third carton 30 in like manner as described above for the seventh use case for the first 10 and second 20 cartons. The processor 18 transmits the determined third point 32 coordinates data and the determined third unavailable volume of the third carton 30 to the data structure 21 for storing in memory device 17 as $LOC_3$ for the third carton 30.

In another example, determining 46 the as-positioned location of the first carton 10 in the pallet space 5 (or the container space 96) includes, for the first carton 10 positioned in the pallet space 5 (or the container space 96), first scanning at least a portion of the pallet space 5 (or the container space 96) including at least a portion of the as-positioned first carton 10 and at least a portion a base plane 60 of the pallet 1 (or the container 90). In this example, the first scanning includes acquiring positional data for a first plurality of points on the exterior surface 45 of the first carton 10. In this example, determining 46 the as-positioned location of the first carton 10 in the pallet space 5 (or the container space 96) includes determining an effective volume 75 of the first carton 10 based at least in part on the acquired positional data for the first plurality of points. In this example, the determining 46 step includes determining the as-positioned location of the first carton 10 in the pallet space 5 (or the container space 96) based at least in part on the acquired positional data for the first plurality of points. In this example, the determining step 46 includes associating the acquired positional data for the first plurality of points and the determined effective volume 75 of the first carton 10 with a first unavailable fractional volume of the pallet space 5 (or the container space 96). In this example, the determining step 46 includes assigning the first unavailable fractional volume to the generated 47 3D map of the pallet space 5 (or the container space 96). The assigned first unavailable fractional volume corresponds to the as-positioned location of the first carton 10 in the pallet space 5 (or the container space 96). In this example, the method 2 includes determining one or more available positions for the at least a second carton 20 in the pallet space 5 (or the container space 96) based at least on part on the assigned first unavailable fractional volume of the first carton 10 in the pallet space 5 (or the container space 96).

In the present example, determining the as-positioned location of the at least a second carton 20 in the pallet space 5 (or the container space 96) includes, for the at least a second carton 20 positioned in the pallet space 5 (or the container space 96), second scanning at least a portion of the pallet space 5 (or the container space 96) including: at least a portion of the as-positioned at least a second carton 20 and at least a portion the base plane 60 of the pallet 1 (or the container 90). In this example, the second scanning includes acquiring positional data for a second plurality of points on the exterior surface 45 of the at least a second carton 20. In this example, determining the as-positioned location of the at least a second carton 20 in the pallet space 5 (or the container space 96) includes determining an effective volume 75 of the at least a second carton 20 based at least in part on the acquired positional data for the second plurality of points. In this example, the determining step includes determining the as-positioned location of the at least a second carton 20 in the pallet space 5 (or the container space 96) based at least in part on the acquired positional data for the second plurality of points. In this example, the determining step includes associating the acquired positional data for the second plurality of points and the determined effective volume 75 of the at least a second carton 20 with at least a second unavailable fractional volume of the pallet space 5 (or the container space 96). In this example, the determining step includes assigning the at least a second unavailable fractional volume to the generated 47 3D map of the pallet space 5 (or the container space 96). The assigned at least a second unavailable fractional volume corresponds to the as-positioned location of the at least a second carton 20 in the pallet space 5 (or the container space 96). In this example, the determining step includes determining the as-positioned location of the at least a second carton 20 in the pallet space 5 (or the container space 96) based at least in part on the acquired positional data for the second plurality of points.

In the present example, the method 2 includes determining the shape attribute of at least one of: the first carton 10, and the at least a second carton 20, based at least in part on the acquired positional data for at least one of the first and second plurality of points, respectively. In the present example, the method 2 includes determining the at least one dimension attribute of at least one of: the first carton 10, and the at least a second carton 20, based at least in part on the acquired positional data for at least one of the first and second plurality of points, respectively. In the present example, the method 2 includes determining the effective volume 75 attribute of at least one of: the first carton 10, and the at least a second carton 20, based at least in part on the acquired positional data for at least one of the first and second plurality of points, respectively. In the present example, the method 2 includes determining the robotic manipulation capability attribute of at least one of: the first carton 10, and the at least a second carton 20, based at least in part on the acquired positional data for at least one of the first and second plurality of points, respectively. In the present example, determining the robotic manipulation capability attribute includes determining if the respective carton (10 and/or 20) is capable of robotic manipulation without human intervention, based at least in part on the acquired positional data for at least one of the first and second plurality of points, respectively. Based on these examples, a ninth use case is discussed below with reference to FIGS. 1-6.

Example 9

Referring to FIGS. 1-6, in the ninth use case, the pallet 1 (or the container 90) is constructed in the loading area 29 of the facility 25. The sensors 8 include a 3D scanner having a line of sight 9 with at least a portion of the first carton 10 and at least a portion of the base plane 60 of the pallet 1 (or the container 90). The sensor 8 scans the at least a portion of the pallet space 5 (or the container space 96) including the at least a portion of the as-positioned first carton 10 and the at least a portion of the base plane 60 of the pallet 1 (or the container 90). The at least a portion of the base plane 60 of the pallet 1 (or the container 90) includes at least one corner 83 of the base plane 60. The 3D scanner sensor 8 acquires positional data for a first plurality of points on the exterior surface 45 of the first carton 10 and the base plane 60. The acquired positional data includes a plurality of pairs of data points for the first carton 10 and the base plane 60. Each pair of data points generated by the 3D scanner for the positional data includes a range from the 3D scanner sensor 8 to a point on the exterior surface 45 of the first carton 10 (or the base plane 60 of the pallet 1 or the container 90) and an angle between the 3D scanner sensor 8 and the respective point.

The 3D scanner data including the plurality of the data pairs is transmitted to the processor 18. The processor 18 analyzes the plurality of data pairs to determine the location (e.g., one of the corners 83) on the base plane 60 for assigning the global origin 15 to. The processor 18 analyzes the plurality of data points to determine 46 the as-positioned location of the first carton 10 in the pallet space 5 (or the container space 96), relative to the determined location of the global origin 15. To determine 46 the as-positioned location of the first carton 10 in the pallet space 5 (or the container space 96) based at least in part on the acquired positional data for the first plurality of points on the exterior surface 45 of the first carton 10 and the base plane 60, the processor 18 runs program instructions stored as software 16 in the location determining module 64. Before, during, or after determining 46 the as-positioned location of the first carton 10, the processor 18 determines an effective volume 75 of the first carton 10 based at least in part on the acquired positional data for the first plurality of points. Before, during, or after determining 46 the as-positioned location of the first carton 10, the processor 18 associates the acquired positional data for the first plurality of points and the determined effective volume 75 of the first carton 10 with a first unavailable fractional volume of the pallet space 5 (or the container space 96). The processor 18 assigns the first unavailable fractional volume to the generated 47 3D map of the pallet space 5 (or the container space 96). The assigned first unavailable fractional volume corresponds to the as-positioned location of the first carton 10 in the pallet space 5 (or the container space 96). Upon determining 46 the as-positioned location of the first carton 10 in the pallet space 5 (or the container space 96) based at least in part on the acquired positional data for the first plurality of points on the exterior surface 45 of the first carton 10 and the base plane 60, the processor 18 associates the determined 46 location (e.g., defined as a first unavailable fractional volume in a substantially similar manner as described above with reference to the seventh use case), with the first carton 10. The processor 18 assigns the determined first unavailable fractional volume to the generated 47 3D map of the pallet space 5 (or the container space 96), where the assigned first unavailable fractional volume corresponds to the as-positioned location of the first carton 10 in the pallet space 5 (or the container space 96). The processor 18 transmits the determined 46 as-positioned location of the first carton 10 to the data structure 21 for storing in memory device 17 as $LOC_1$ for the first carton 10.

Before or during the positioning of the at least a second carton 20 on the pallet 1 (or the container 90), the processor 18 determines one or more available positions for the at least a second carton 20 in the pallet space 5 (or the container space 96) based at least on part on the assigned first unavailable fractional volume of the first carton 10 in the pallet space 5 (or the container space 96). To determine the one or more available positions for the at least a second carton 20 in the pallet space 5 (or the container space 96), the processor 18 runs program instructions stored as software 16 in an available position determining module 69.

With the first carton 10 positioned on the pallet 1 (or the container 90), the sensors 8 including the 3D scanner having a line of sight 9 with at least a portion of the second carton 20 and at least a portion of the base plane 60 of the pallet 1 (or the container 90). The sensor 8 scans the at least a portion of the pallet space 5 (or the container space 96) including the at least a portion of the as-positioned second carton 20 and the at least a portion of the base plane 60 of the pallet 1 (or the container 90). The at least a portion of the base plane 60 of the pallet 1 (or the container 90) includes the at least one corner 83 of the base plane 60. The 3D scanner sensor 8 acquires positional data for a second plurality of points on the exterior surface 45 of the second carton 20 and the base plane 60. The acquired positional data includes a plurality of pairs of data points for the second carton 20 and the base plane 60. Each pair of data points generated by the 3D scanner includes a range from the 3D scanner sensor 8 to a point on the exterior surface 45 of the second carton 20 (or the base plane 60 of the pallet 1 or the container 90) and an angle between the 3D scanner sensor 8 and the respective point.

The 3D scanner data including the plurality of the data pairs is transmitted to the processor 18. The processor 18 analyzes the plurality of data points to determine the as-positioned location of the second carton 20 in the pallet space 5 (or the container space 96), relative to the determined location of the global origin 15. To determine the as-positioned location of the second carton 20 in the pallet space 5 (or the container space 96) based at least in part on the acquired positional data for the second plurality of points on the exterior surface 45 of the second carton 20 and the base plane 60, the processor 18 runs program instructions stored as software 16 in the location determining module 64. The processor 18 determines an effective volume 75 of the at least a second carton 20 in the pallet space 5 (or the container space 96) based at least in part on the acquired positional data for the second plurality of points. The processor 18 associates the acquired positional data for the second plurality of points and the determined effective volume 75 of the at least a second carton 20 with at least a second unavailable fractional volume of the pallet space 5 (or the container space 96). The processor 18 assigns the at least a second unavailable fractional volume to the generated 47 3D map of the pallet space 5 (or the container space 96), where the assigned at least a second unavailable fractional volume corresponds to the as positioned location of the at least a second carton 20 in the pallet space 5 (or the container space 96). The processor 18 transmits the determined location of the second carton 20 to the data structure 21 for storing in memory device 17 as $LOC_2$ for the second carton 20.

During construction of the pallet 1 (or loading of the container 90), the third carton 30 is positioned on the base plane 60 thereof. The 3D scanner sensor 8 scans at least a portion of the pallet space 5 (or the container space 96) including the at least a portion of the as-positioned third carton 30 and the at least a portion of the base plane 60 of the pallet 1 (or the container 90). The 3D scanner sensor 8 acquires positional data for a third plurality of points on the exterior surface 45 of the third carton 30 and the base plane 60. The acquired positional data includes a plurality of pairs of data points for the third carton 30 and the base plane 60. Each pair of data points generated by the 3D scanner includes a range from the 3D scanner sensor 8 to a point on the exterior surface 45 of the third carton 30 (or the base plane 60 of the pallet 1 or the container 90) and an angle between the 3D scanner sensor 8 and the respective point.

The 3D scanner data including the plurality of the data pairs is transmitted to the processor 18. The processor 18 analyzes the plurality of data pairs to determine a shape attribute, at least one dimensional attribute (e.g., length, width, height), and/or an effective volume 75 attribute of the third carton 30. For determining the shape attribute, the at least one dimensional attribute (e.g., length, width, height), and/or the effective volume 75 attribute of the third carton 30, the processor 18 runs program instructions stored as software 16 in the attribute determining module 63. Upon determining the shape and dimensional attributes of the third carton 30 as a square cube with side length 140 cm and an effective volume 75 of $2.744 \times 10^3$ cm$^3$, the processor 18 associates the determined shape, dimensional, and effective volume 75 attribute data with the third carton 30. The processor 18 transmits the shape, dimensional, and effective volume 75 attribute data of the third carton 30 to the data structure 21 for storing in memory device 17 as $VALUES_3$ for the third carton 30.

For the third carton 30, the processor 18 analyzes the plurality of data pairs to determine, based at least in part on the acquired positional data for the third plurality of points, the processor 18 determines that the robotic manipulation capability attribute of the third carton 30 is capable of robotic manipulation without human intervention. Upon determining that the robotic manipulation capability attribute of the third carton 30 is capable of robotic manipulation without human intervention, the processor 18 associates the determined robotic manipulation capability attribute with the third carton 30. The processor 18 transmits the robotic manipulation capability attribute of the third carton 30 to the data structure 21 for storing in memory device 17 as a $VALUE_3$ for the third carton 30.

In another example, determining 46 the as-positioned location of the first carton 10 in the pallet space 5 (or the container space 96) includes, for the first carton 10 positioned in the pallet space 5 (or the container space 96), first imaging at least a portion of the pallet space 5 (or the container space 96) including at least a portion of the as-positioned first carton 10 and at least a portion of the base plane 60 of the pallet 1 (or the container 90). In this example, the first imaging includes acquiring image data for the at least a portion of the as-positioned first carton 10. In this example, the determining 46 step includes determining the as-positioned location of the first carton 10 in the pallet space 5 (or the container space 96) based at least in part on the acquired image data for the at least a portion of the as-positioned first carton 10.

In the present example, determining the as-positioned location of the at least a second carton 20 in the pallet space 5 (or the container space 96) includes, for the at least a second carton 20 positioned in the pallet space 5 (or the container space 96), second imaging at least a portion of the pallet space 5 (or the container space 96) including at least a portion of the as-positioned at least a second carton 20 and at least a portion the base plane 60 of the pallet 1 (or the container 90). In this example, the second imaging includes acquiring image data for the at least a portion of the as-positioned at least a second carton 20. In this example, the determining step includes determining the as-positioned location of the at least a second carton 20 in the pallet space 5 (or the container space 96) based at least in part on the acquired image data for the at least a portion of the as-positioned at least a second carton 20.

In the present example, the method 2 includes determining the shape attribute of at least one of: the first carton 10, and the at least a second carton 20, based at least in part on the acquired image data for the respective carton (10 and/or 20). In the present example, the method 2 includes determining the at least one dimension attribute of at least one of: the first carton 10, and the at least a second carton 20, based at least in part on the acquired image data for the respective carton (10 and/or 20). In the present example, the method 2 includes determining the effective volume 75 attribute of at least one of: the first carton 10, and the at least a second carton 20, based at least in part on the acquired image data for the respective carton (10 and/or 20). In the present example, the method 2 includes determining the robotic manipulation capability attribute of at least one of: the first carton 10, and the at least a second carton 20, based at least in part on the acquired image data for the respective carton (10 and/or 20). In the present example, determining the robotic manipulation capability attribute includes determining if the respective carton (10 and/or 20) is capable of robotic manipulation without human intervention, based at least in part on the acquired image data for the respective carton (10 and/or 20). Based on these examples, an tenth use case is discussed below with reference to FIGS. 1-6.

Example 10

Referring to FIGS. 1-6, in the tenth use case, the pallet 1 (or the container 90) is constructed in the loading area 29 of the facility 25. The sensors 8 include camera- or other imaging device-type sensor(s) 8 having a line of sight 9 with at least a portion of the first carton 10 and at least a portion of the base plane 60 of the pallet 1 (or the container 90). The sensor 8 captures image(s) of the at least a portion of the pallet space 5 (or the container space 96) including the at least a portion of the as-positioned first carton 10 and the at least a portion of the base plane 60 of the pallet 1 (or the container 90). The at least a portion of the base plane 60 of the pallet 1 (or the container 90) includes at least one corner 83 of the base plane 60. The camera- or other imaging-type sensor 8 acquires image data for at least a portion of the as-positioned first carton 10 and the base plane 60.

The image data is transmitted to the processor 18. The processor 18 analyzes the image data using an image-processing algorithm to determine the location (e.g., one of the corners 83) on the base plane 60 for assigning the global origin 15 to. The processor 18 analyzes the image data to determine 46 the as-positioned location of the first carton 10 in the pallet space 5 (or the container space 96), relative to the determined location of the global origin 15. To determine 46 the as-positioned location of the first carton 10 in the pallet space 5 (or the container space 96) based at least in part on the acquired image data of the first carton 10 and the base plane 60, the processor 18 runs program instructions stored as software 16 in the location determining module 64. Upon determining 46 the as-positioned location of the first carton 10 in the pallet space 5 (or the container space 96) based at least in part on the acquired image data for the first carton 10 and the base plane 60, the processor 18 associates the determined location (e.g., defined as a first unavailable fractional volume in a substantially similar manner as described above with reference to the seventh use case) with the first carton 10. The processor 18 transmits the determined 46 location of the first carton 10 to the data structure 21 for storing in memory device 17 as $LOC_1$ for the first carton 10.

With the first carton 10 positioned on the pallet 1 (or the container 90), the sensors 8 including the camera- or other imaging-type device have a line of sight 9 with at least a portion of the second carton 20 and at least a portion of the base plane 60 of the pallet 1 (or the container 90). The sensor 8 capture image(s) of the at least a portion of the pallet space 5 (or the container space 96) including the at least a portion of the as-positioned second carton 20 and the at least a portion of the base plane 60 of the pallet 1 (or the container 90). The at least a portion of the base plane 60 of the pallet 1 (or the container 90) includes the at least one corner 83 of the base plane 60. The camera- or other imaging-type sensor 8 acquires image data for the second carton 20 and the base plane 60.

The image data is transmitted to the processor 18. The processor 18 analyzes the image data to determine the as-positioned location of the second carton 20 in the pallet space 5 (or the container space 96), relative to the determined location of the global origin 15. To determine the as-positioned location of the second carton 20 in the pallet space 5 (or the container space 96) based at least in part on the acquired image data of the second carton 20 and the base plane 60, the processor 18 runs program instructions stored as software 16 in the location determining module 64. Upon determining the as-positioned location of the second carton 20 in the pallet space 5 (or the container space 96) based at least in part on the acquired image data for the second carton 20 and the base plane 60, the processor 18 associates the determined location (e.g., defined as a first unavailable fractional volume in a substantially similar manner as described above with reference to the seventh use case) with the second carton 20. The processor 18 transmits the determined location of the second carton 20 to the data structure 21 for storing in memory device 17 as $LOC_2$ for the second carton 20.

During construction of the pallet 1 (or loading of the container 90), the third carton 30 is positioned on the base plane 60 thereof. The camera- or other imaging-type sensor 8 captures image(s) at least a portion of the pallet space 5 (or the container space 96) including the at least a portion of the as-positioned third carton 30 and the at least a portion of the base plane 60 of the pallet 1 (or the container 90). The camera- or other imaging-type sensor 8 acquires image data for the third carton 30 and the base plane 60.

The image data is transmitted to the processor 18. The processor 18 analyzes the image data using an image processing algorithm to determine, based at least in part on the acquired image data, a shape attribute, at least one dimensional attribute (e.g., length, width, height), and/or an effective volume 75 attribute of the third carton 30. For determining the shape attribute, the at least one dimensional attribute (e.g., length, width, height), and/or the effective volume 75 attribute of the third carton 30, the processor 18 runs program instructions stored as software 16 in the attribute determining module 63. Upon determining the shape and dimensional attributes of the third carton 30 as a square cube with side length 140 cm and an effective volume 75 of $2.744 \times 10^3$ cm$^3$, the processor 18 associates the determined shape, dimensional, and effective volume 75 attribute data with the third carton 30. The processor 18 transmits the shape, dimensional, and effective volume 75 attribute data of the third carton 30 to the data structure 21 for storing in memory device 17 as $VALUES_3$ for the third carton 30.

For the third carton 30, the processor 18 analyzes the image data using an image processing algorithm to determine, based at least in part on the acquired image data for the as-positioned third carton 30 and the base plane 60 that the robotic manipulation capability attribute of the third carton 30 is capable of robotic manipulation without human intervention. Upon determining that the robotic manipulation capability attribute of the third carton 30 is capable of robotic manipulation without human intervention, the processor 18 associates the determined robotic manipulation capability attribute with the third carton 30. The processor 18 transmits the robotic manipulation capability attribute of the third carton 30 to the data structure 21 for storing in memory device 17 as a $VALUE_3$ for the third carton 30.

In another example, the computing device 4 (e.g., the processor 18 via the communication interface 24) and/or the server 11 is operably coupled in communication with an array 77 of pressure sensors 78 positioned on an upper surface 79 of the base plane 60 of the pallet 1 (or the container 90). In this example, determining 46 the as-positioned location of the first carton 10 in the pallet space 5 (or the container space 96) includes, for the first carton 10 positioned in the pallet space 5 (or the container space 96), first sensing a change in pressure upon at least one of the pressure sensors 78 of the array 77. In this example, the determining 46 step includes first determining a location of the at least one pressure sensor 78 of the array 77 of pressure sensors 78 on the base plane 60 for which the change in pressure was sensed for the first sensing step. In this example, the determining 46 step includes determining the as-positioned location of the first carton 10 in the pallet space 5 (or the container space 96) based at least in part on at least of the first sensed change in pressure and the first determined location(s) of the at least one pressure sensor 78 of the array 77.

In the present example, determining the as-positioned location of the at least a second carton 20 in the pallet space 5 (or the container space 96) includes, for the at least a second carton 20 positioned in the pallet space 5 (or the container space 96), second sensing a change in pressure upon at least one pressure sensor 78 of the array 77. In this example, the determining step includes second determining a location of the at least one pressure sensor 78 of the array 77 of pressure sensors 78 on the base plane 60 for which the change in pressure was sensed for the second sensing step. In this example, the determining step includes determining the as-positioned location of the at least a second carton 20 in the pallet space 5 (or the container space 96) based at least in part on at least of the second sensed change in pressure and the second determined location(s) of the at least one pressure sensor 78 of the array 77.

In another example, the computing device 4 (e.g., the processor 18 via the communication interface 24) and/or the server 11 is operably coupled in communication with an array of accelerometer sensors (not shown) positioned on the upper surface 79 of the base plane 60 of the pallet 1 (or the container 90). In the example, determining 46 the as-positioned location of the first carton 10 in the pallet space 5 (or the container space 96) includes, for the first carton 10 positioned in the pallet space 5 (or the container space 96), first detecting an acceleration and/or vibrational disturbance upon at least one of the accelerometer sensors of the array. In the example, the determining 46 step includes first determining a location of the at least one accelerometer sensor of the array of accelerometer sensors on the base plane 60 for which the acceleration and/or vibrational disturbance was sensed for the first detecting step. In the example, the determining 46 step includes determining the as-positioned location of the first carton 10 in the pallet space 5 (or the container space 96) based at least in part on at least of the first detected acceleration and/or vibrational disturbance and the first determined location(s) of the at least one accelerometer sensor of the array. In the example, the magnitude of the first detected acceleration and/or vibrational disturbance detected by the at least one accelerometer sensor is proportional to the weight of the first carton 10. In the example, the greater the weight of the first carton 10 being positioned on the pallet 1 (or the container 90), the greater the magnitude of the first detected acceleration and/or vibrational disturbance detected by the accelerometer sensor(s).

In yet another example, determining the as-positioned location of the at least a second carton 20 in the pallet space 5 (or the container space 96) includes, for the at least a second carton 20 positioned in the pallet space 5 (or the container space 96), second detecting an acceleration and/or vibrational disturbance upon at least one of the accelerometer sensors of the array. In this example, the determining step includes second determining a location of the at least one accelerometer sensor of the array on the base plane 60 for which the acceleration and/or vibrational disturbance was sensed for the second detecting step. In the example, the determining step includes determining the as-positioned location of the at least a second carton 20 in the pallet space 5 (or the container space 96) based at least in part on at least of the second detected acceleration and/or vibrational disturbance and the second determined location(s) of the at least one accelerometer sensor of the array. In the example, the magnitude of the second detected acceleration and/or vibrational disturbance detected by the at least one accelerometer sensor is proportional to the weight of the second carton 20. In the example, the greater the weight of the second carton 20 being positioned on the pallet 1 (or the container 90), the greater the magnitude of the second detected acceleration and/or vibrational disturbance detected by the accelerometer sensor(s).

In the present example, the method 2 includes determining a weight attribute of at least one of: the first carton 10, and the at least a second carton 20, based at least in part on at least one of: (i) at least one: of the first sensed change in pressure, and the first determined location of the at least one pressure sensor 78 of the array 77, and (ii) at least one of: the second sensed change in pressure, and the second determined location of the at least one pressure sensor 78 of the array 77, respectively. Based on these examples, an eleventh use case is discussed below with reference to FIGS. 1-6.

Example 11

Referring to FIGS. 1-6, in the eleventh use case, the pallet 1 (or the container 90) is constructed in the loading area 29 of the facility 25. At least one pressure sensor 78 of the array 77 of pressure sensors 78 positioned on an upper surface 79 of the base plane 60 of the pallet 1 (or the container 90) senses a first change in pressure due to the positioning of the first carton 10 on the base plane 60. The magnitude of the first sensed change in pressure sensed by the at least one pressure sensor 78 is proportional to the weight of the first carton 10. In this case, the greater the weight of the respective carton 3 being positioned on the pallet 1 (or the container 90), the greater the magnitude of the change in pressure sensed by the pressure sensor(s) 78. The pressure sensors 78 of the array 77 each have a unique ID and a known position on the upper surface 79 of the base plane 60 such that each of them are mapped by (x, y) coordinates on the base plane 60 relative to the assigned global origin 15.

The pressure sensor(s) 78 of the array 77 which sensed the change(s) in pressure due to the positioning of the first carton 10 on the base plane 60 of the pallet 1 (or the container 90) transmit their respectively sensed pressure change magnitudes and their respective IDs and/or x, y coordinates in the base plane 60 to the processor 18. The processor 18 analyzes these data to determine the location(s) on the base plane 60 of the pressure sensor(s) 78 for which the change in pressure was sensed due to positioning of the first carton 10 on the base plane 60. In this case, the processor 18 receives the unique identifier(s) from the accelerometer sensor(s) 8 for which the change in pressure was sensed due to positioning of the first carton 10 on the base plane 60 and associates each of them with their respective x,y coordinates (e.g., by reading these data from a lookup table stored in the memory device 17). The processor 18 determines, based at least in part on the determined location(s) of the pressure sensor(s) 78 for which the change in pressure was sensed due to positioning of the first carton 10 on the base plane 60, the as-positioned location of the first carton 10 in the pallet space 5 (or the container space 96) relative to the global origin 15. To determine 46 the as-positioned location of the first carton 10 in the pallet space 5 (or the container space 96) based at least in part on the determined location(s) of the pressure sensor(s) 78 for which the change in pressure was sensed, the processor 18 runs program instructions stored as software 16 in the location determining module 64. Upon determining 46 the as-positioned location of the first carton 10 in the pallet space 5 (or the container space 96) based at least in part on the determined location(s) of the pressure sensor(s) 78 for which the change in pressure was sensed, the processor 18 associates the determined 46 location with the first carton 10. The processor 18 transmits the determined 46 location of the first carton 10 to the data structure 21 for storing in memory device 17 as $LOC_1$ for the first carton 10.

The processor 18 receives the magnitude(s) of the pressure change(s) including unique identifier(s) from the pressure sensor(s) 78 for which the change in pressure was sensed due to positioning of the first carton 10 on the base plane 60. The processor 18 analyzes these data to determine a weight attribute of the first carton 10 based at least in part on the first sensed change in pressure and/or the first determined location for the pressure sensor(s) 78 for which the change in pressure was sensed due to positioning of the first carton 10 on the base plane 60. To determine the weight attribute of the as-positioned first carton 10 based at least in part on the first sensed change in pressure and/or the first determined location for the pressure sensor(s) 78 for which the change in pressure was sensed due to positioning of the first carton 10 on the base plane 60, the processor 18 runs program instructions stored as software 16 in the attribute determining module 63. Upon determining the weight attribute of the as-positioned first carton 10 based at least in part on the first sensed change in pressure and/or the first determined location for the pressure sensor(s) 78 for which the change in pressure was sensed due to positioning of the first carton 10 on the base plane 60, the processor 18 associates 44 the determined weight attribute with the first carton 10 identifier. The processor 18 transmits the determined weight attribute of the first carton 10 to the data structure 21 for storing in memory device 17 as $VALUE_1$ for the first carton 10.

In this example, the pressure sensors 78 are deployed over the base plane 60 for determining the x and y location thereupon (e.g., ($x_{pc}$, $y_{pc}$) relative to the global origin 15) of the force exerted by placing a carton 3 on the pallet 1 (or in container 90) at a z height (e.g. directly on the base plane (e.g., $z_{pc}=0$), or on top of other carton(s) 3 ($z_{pc}>0$)). If previously positioned carton(s) 3 are accurately so measured, and the 3D map is accurately generated 47, when the (x,y) location of the added carton 3 is determined from the pressure sensors 78, the z position can be inferred by processor(s) 18 (e.g., by running program instructions stored as software 16 in location determining module 64) based upon the historical location(s) of other carton(s) 3. For instance, if there is a 12 inch tall box in the left front corner of the base plane 60, and the pressure sensors 78 indicate placing another carton 3 on top of this formerly positioned carton 3 results in a center of force being placed over the footprint of the formerly positioned 12 inch tall box, processor(s) 18 can utilize the pressure sensor 78 readings to indirectly determine the new box is on top of it.

This form of indirect carton 3 position determination by processor(s) 18 may be prone to stacked inaccuracies of the generated 47 map, and may also be intolerant to carton(s) 3 being shifted not one at a time. Should the operator need to reposition carton(s) 3, so long as the carton(s) 3 are removed one at a time and replaced one at a time, the system 6 should be able to determine, using data from pressure sensors 78, which carton 3 was removed based on the total mass of the removed carton 3 and the center of the force of the removed weight. However, reliability and robustness for determining as-positioned locations of cartons 3 in the pallet space 5 or in the container space 96 may be enhanced by having some form of direct measurement or confirmation of z height and carton placement. This could be accomplished with external camera(s) or imaging sensor(s) 8. While it would be straightforward and inexpensive to use such vision systems and/or external sensor(s) 8 for carton 3 positional confirmation, operational scenarios could arise where external confirmation would be difficult or impossible.

To address these contingencies and to ensure continuous uninterrupted and high-throughput operation with minimal human user 7 interaction, the disclosed method 2 and system 6 may include redundant carton 3 positional sensing modalities to provide flexibility and continuity for accurately determining carton 3 position. In such cases, all potential sources of carton 3 positional information may be utilized by processor(s) 18 to derive a best estimate based on available data. In this way, the generated 47 3D map of the pallet 5 or container 96 can include information about which carton 3 positional sensing data sources have been used to determine the positions of each carton 3, such that a confidence score for the carton 3 placement is created along with a priority map for which carton 3 location(s) should be assessed again when additional positional and/or other carton 3-related information sources are found.

In an example, generating 47 the 3D map of the pallet space 5 (or the container space 96) includes first mapping the first carton 10 to a first position in the pallet space 5 (or the container space 96) based on the determined identity (e.g., by step 41) and as-positioned location (e.g., by step 42) of the first carton 10 therein. In this example, the generating step 47 includes second mapping the at least a second carton 20 to a second position in the pallet space 5 (or the container space 96) based on the determined identity and as-positioned location (e.g., by step 46) of the at least a second carton 20 therein. In this example, the generating step 47 includes updating the generated 3D map of the pallet space 5 (or the container space 96) for additional cartons (e.g., a third carton 30) in the pallet space 5 (or the container space 96) based on the determined identities and as-positioned locations of the additional cartons 3 therein. Based on these examples, a twelfth use case is discussed below with reference to FIGS. 1-6.

Example 12

Referring to FIGS. 1-6, in the twelfth use case, during or after the positioning of the first carton 10 on the pallet 1 (or the container 90), the processor 18 first maps the first carton 10 to the first position in the pallet space 5 (or the container space 96). The processor 18 first maps the first carton 10 to the first position during or after reading the determined identity and the determined 46 as-positioned location of the first carton 10 from memory device(s) 17. To perform the first mapping of the first carton 10 in the pallet space 5 (or the container space 96) based at least in part on the determined identity and determined 46 as-positioned location of the first carton 10, the processor 18 runs program instructions stored as software 16 in a 3D map generating module 66. Upon first mapping the first carton 10 in the pallet space 5 (or the container space 96), the processor 18 generates 47 the 3D map of the pallet space 5 (or the container space 96) including the first mapped first carton 10 and transmits data representative of the generated 3D map to the memory device 17 for storage therein.

During or after the first mapping of the first carton 10, the processor 18 second maps the second carton 20 to the second position in the pallet space 5 (or the container space 96). The processor 18 second maps the second carton 20 to the second position during or after reading the determined identity and the as-positioned location of the second carton 20 from memory device(s) 17. To perform the second mapping of the second carton 20 in the pallet space 5 (or the container space 96) based at least in part on the determined identity and as-positioned location of the second carton 20, the processor 18 runs program instructions stored as software 16 in the 3D map generating module 66. Upon second mapping the second carton 20 in the pallet space 5 (or the container space 96), the processor 18 updates the 3D map of the pallet space 5 (or the container space 96) including the second mapped second carton 20 and transmits data representative of the updated 3D map to the memory device 17 for storage therein.

During or after the second mapping of the second carton 20, and for any additional cartons 3 (e.g., third 30, . . . , (n−1)-th, and n-th cartons) beyond the second carton 20, the processor 18 continues to map the subsequent carton(s) 3 to subsequent position(s) in the pallet space 5 (or the container space 96). The processor 18 maps the additional cartons(s) 3 to the subsequent position(s) during or after reading the determined identity(ies) and the as-positioned location(s) of the additional carton(s) 3 from memory device(s) 17. To perform the subsequent mapping of the additional carton(s) 3 in the pallet space 5 (or the container space 96) based at least in part on the determined identity(ies) and as-positioned location(s) of the additional carton(s) 3, the processor 18 runs program instructions stored as software 16 in the 3D map generating module 66. Upon mapping the additional carton(s) 3 in the pallet space 5 (or the container space 96), the processor 18 updates the 3D map of the pallet space 5 (or the container space 96) including the mapped additional carton(s) 3 and transmits data representative of the updated 3D map to the memory device 17 for storage therein.

During or after mapping the final (e.g., the n-th carton) to its respective position in the pallet space 5 (or the container space 96), upon command by, for instance, the user 7 of system 6, the processor 18 runs program instructions stored as software 16 in the 3D map generating module 66 to read from memory device 17 the data representative of the updated 3D map and render the updated 3D map in human-readable form to an output device (e.g., a display and/or printer) in communication with the computing device 4. The output device is located in the facility 25, vehicle, and/or in a remote location. Similarly, in the course of positioned carton(s) 3 being removed (e.g., unloaded) from the pallet 1 (or the container 90), the processor 18 updates the 3D map. To update the 3D map during the course of carton(s) 3 being removed from the pallet 1 (or the container 90), the processor 18 runs program instructions stored as software 16 in the 3D map generating module 66 and utilizes data obtained from the sensor(s) 8 and/or the pressure sensors 78 (e.g., as described in the foregoing use case examples).

In an example, the method 2 includes determining an identity of the as-constructed pallet 85 (or the as-loaded container 97). In this example, associating the generated 47 3D map with the as-constructed pallet 85 (or the as-loaded container 97) includes storing the generated 47 3D map of the pallet space 5 (or the container space 96) in the memory device 17 (e.g., in the data structure 21) in association with the determined identity of the as-constructed pallet 85 (or the as-loaded container 97). In the present example, the method 2 includes transmitting the generated 47 3D map of the pallet space 5 (or the container space 96) to a receiving facility for the as-constructed pallet 85 (or the as-loaded container 97). Based on these examples, a thirteenth use case is discussed below with reference to FIGS. 1-6.

Example 13

Referring to FIGS. 1-6, in the thirteenth use case, during or after the positioning of the first carton 10 and any additional carton(s) 3 (e.g., third 30, . . . , (n−1)-th, and n-th cartons) on the pallet 1 (or the container 90), the processor 18 utilizes data obtained from the sensor(s) 8 to determine the identity of the as-constructed pallet 85 (or the as-loaded container 97) including by reading, receiving, and/or decoding identifying information 50, bar code 80, QR code 92, and/or signals received from the transmitter device 40 positioned on or in the pallet 1 (or the container 90). During or after identifying the as-constructed pallet 85 (or the as-loaded container 97), the processor 18 associates the generated 47 3D map and/or updated 3D map with the as-constructed pallet 85 (or the as-loaded container 97). To associate the generated 47 3D map and/or updated 3D map with the as-constructed pallet 85 (or the as-loaded container 97), the processor 18 runs program instructions stored as software 16 in a 3D map associating module 68.

During or after associating the generated 47 3D map and/or updated 3D map with the as-constructed pallet 85 (or the as-loaded container 97), the processor 18 transmits the data representative of the generated and/or updated 3D map to the memory device 17 for storage therein in association with the determined identity of the as-constructed pallet 85 (or the as-loaded container 97). Also, during or after associating the generated 47 3D map and/or updated 3D map with the as-constructed pallet 85 (or the as-loaded container 97), the processor 18 transmits the generated 47 3D map and/or the updated 3D map of the pallet space 5 (or the container space 96) to a receiving facility (not shown in the figures) for the as-constructed pallet 85 (or the as-loaded container 97).

In an example, the as-constructed pallet 85 (or the as-loaded container 97) is one of a plurality of as-constructed pallets 85 (or as-loaded containers 97) for positioning in the facility 25 (or the vehicle). In this example, the method 2 includes determining an identity of each of the plurality of as-constructed pallets 85 (or each of the plurality of as-loaded containers 97) for positioning in the facility space 26 (or the vehicle space). In this example, the method 2 includes determining an identity of the facility 25 (or the vehicle). In this example, the method 2 includes determining an as-loaded location of each of the plurality of as-constructed pallets 85 (or each of the plurality of as-loaded containers 97) in the facility space 26 (or the vehicle space).

In the present example, the method 2 includes generating a facility 3D map (or a vehicle 3D map) of the facility space 26 (or the vehicle space), respectively, based on the determined identities and as-loaded locations of each of the plurality of as-constructed pallets 85 (or each of the plurality of as-loaded containers 97) in the facility space 26 (or the vehicle space). In this example, the method 2 includes associating the generated facility 3D map (or the generated vehicle 3D map) with an as-loaded facility (or an as-loaded vehicle).

In the present example, associating the generated facility 3D map (or the generated vehicle 3D map) with the as-loaded facility (or the as-loaded vehicle) includes storing the generated facility 3D map (or the generated vehicle 3D map) in the memory device 17 (e.g., in the data structure 21) in association with the determined identity of the facility 25 (or the vehicle). In this example, the method 2 includes the processor 18 transmitting the generated facility 3D map (or the generated vehicle 3D map) to a receiving facility for the as-loaded facility or an as-loaded vehicle.

Various embodiments disclosed herein are to be taken in the illustrative and explanatory sense, and should in no way be construed as limiting of the present disclosure.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for mapping locations of cartons, comprising:
   for a first carton:
   (i) assigning a first identifier to the first carton received for positioning in: a pallet space of a pallet, or in a container space of a container;
   (ii) determining one or more physical properties of the first carton;
   (iii) associating the one or more physical properties of the first carton with the first identifier;
   (iv) determining an as-positioned location of the first carton in the pallet space or in the container space, wherein the determining of the as-positioned location of the first carton in the pallet space or in the container space includes:
   assigning a coordinate frame (f) to the first carton, the coordinate frame (f) having a local origin defined or at least approximated as a frame point on or proximal to an exterior surface of the carton, the frame point defined as $xf=0$, $yf=0$, and $zf=0$;
   determining an effective volume of the first carton relative to the at least one assigned coordinate frame (f), and
   determining, for the as-positioned first carton, frame coordinates of the local origin of the first carton in an assigned global coordinate system of the pallet space or the container space; and
   (v) generating a three-dimensional (3D) map of the pallet space or the container space based on: the determined one or more physical properties of the first carton, and the determined as-positioned location of the first carton in the pallet space or in the container space.

2. The method of claim 1 further comprising:
   for at least a second carton:
   (vi) assigning at least a second identifier to the at least a second carton received for positioning in the pallet space or in the container space;
   (vii) determining one of more physical properties of the at least a second carton;
   (viii) associating the one or more physical properties of the at least a second carton with the at least a second identifier; and
   (ix) determining an as-positioned location of the at least a second carton in the pallet space or in the container space, wherein the determining of the as-positioned location of the at least a second carton in the pallet space or in the container space includes:
   assigning a coordinate frame (f) to the at least a second carton, the coordinate frame (f) having a local origin defined or at least approximated as a frame point on or proximal to an exterior surface of the carton, the frame point defined as $xf=0$, $yf=0$, and $zf=0$;
   determining an effective volume of the at least a second carton relative to the at least one assigned coordinate frame (f), and
   determining, for the as-positioned at least a second carton, frame coordinates of the local origin of the at least a second carton in the assigned global coordinate system of the pallet space or the container space, and
   wherein generating the 3D map further comprises generating the 3D map of the pallet space or the container space further based on: the determined one or more physical properties of the at least a second carton, and the determined as-positioned locations of the first carton and the at least a second carton in the pallet space or in the container space.

3. The method of claim 2, further comprising:
   (A) determining an available base plane area of a base plane of the pallet or the container;
   (B) determining a volume available for positioning a respective carton of the first and the at least a second carton in the pallet space or in the container space;
   (C) assigning, based on at least: the determined available base plane area, and the volume available, the global coordinate system (pc) to the pallet space or the container space, the global coordinate system (pc) having a global origin defined or at least approximated as a global point on the base plane, the global point defined as $xpc=0$, $ypc=0$, and $zpc=0$; and
   (D) associating the assigned global coordinate system to: the pallet, or the container.

4. The method of claim 3, wherein generating the 3D map further comprises: associating: the determined effective volume of the respective carton, and the determined local origin, with an unavailable fractional volume of the pallet space or the container space.

5. The method of claim 4, wherein the unavailable fractional volume of the pallet space or in the container space corresponds to the as-positioned location of the respective carton in the pallet space or in the container space, the method further comprising:

determining an available position for a subsequent carton in the pallet space or in the container space based on the unavailable fractional volume of the pallet space or the container space.

6. The method of claim 2, wherein the one or more physical properties include at least one of: an identity, one or more dimensions, a weight, and a robotic manipulation capability attribute, of a respective carton of the first and the at least a second carton, and wherein at least one of the steps of: (ii) determining the one or more physical properties of the first carton, and (vii) determining the one or more physical properties of the at least a second carton, comprises at least one of:

(a) capturing, by a sensor, at least one image of at least a portion of the respective carton;

(b) analyzing the at least one image to extract the one or more physical properties of the respective carton;

(c) receiving, from a transmitter device positioned in or on the respective carton, a signal encoding data including the one or more physical properties of the respective carton;

(d) decoding the signal received from the transmitter device to extract the one or more physical properties of the respective carton;

(e) receiving, from a commissioning system, a signal encoding data including the one or more physical properties of the respective carton; and (f) decoding the signal received from the commissioning system to extract the one or more physical properties of the respective carton.

7. The method of claim 6, wherein generating the 3D map of the pallet space or the container space further comprises at least one of:

first mapping the first carton to a first position in the pallet space or the container space based on at least one of: the associated extracted identity, the associated extracted one or more dimensions, the associated extracted weight, and the associated extracted robotic manipulation capability attribute, of the first carton; and second mapping the at least a second carton to a second position in the pallet space or the container space based on at least one of: the associated extracted identity, the associated extracted one or more dimensions, the associated extracted weight, and the associated extracted robotic manipulation capability attribute, of the at least a second carton.

8. The method of claim 7, further comprising updating the generated 3D map of the pallet space or the container space for a subsequent carton positioned in a subsequent location in the pallet space or the container space based on at least one of: an associated extracted identity, an associated extracted one or more dimensions, an associated extracted weight, and an associated extracted robotic manipulation capability attribute, of the subsequent carton.

9. A system for mapping locations of cartons, comprising:
one or more memory devices; and
one or more processors in communication with the one or more memory devices, wherein the one or more processors are programmed to:
for a first carton:
(i) assign a first identifier to the first carton received for positioning in: a pallet space of a pallet, or in a container space of a container;
(ii) determine one or more physical properties of the first carton;
(iii) associate the one or more physical properties of the first carton with the first identifier;
(iv) determine an as-positioned location of the first carton in the pallet space or in the container space, the pallet space or container space having an assigned global coordinate system, and wherein the as-positioned location of the first carton in the assigned global coordinate system of the pallet space or the container space includes: frame coordinates of a local origin of the first carton of a coordinate frame (f) assigned to the first carton, wherein the local origin is defined or at least approximated as a frame point on or proximal to an exterior surface of the carton, the frame point defined as xf=0, yf=0, and zf=0, and a determined effective volume relative to the assigned coordinate frame (f); and
(v) generate a three-dimensional (3D) map of the pallet space or the container space based on: the determined one or more physical properties of the first carton, and the determined as-positioned location of the first carton in the pallet space or in the container space.

10. The system of claim 9, wherein the one or more processors are further programmed to:
for at least a second carton:
(vi) assign at least a second identifier to the at least a second carton received for positioning in the pallet space or in the container space;
(vii) determine one of more physical properties of the at least a second carton;
(viii) associate the one or more physical properties of the at least a second carton with the at least a second identifier; and
(ix) determine an as-positioned location of the at least a second carton in the pallet space or in the container space, the pallet space or container space having an assigned global coordinate system, and wherein the as-positioned location of the at least a second carton in the assigned global coordinate system of the pallet space or the container space includes: frame coordinates of a local origin of the at least a second carton of a coordinate frame (f) assigned to the at least a second carton, wherein the local origin is defined or at least approximated as a frame point on or proximal to an exterior surface of the carton, the frame point defined as xf=0, yf=0, and zf=0, and a determined effective volume relative to the assigned coordinate frame (f),
wherein, for generating the 3D map, the one or more processors are further programmed to generate the 3D map of the pallet space or the container space further based on: the determined one or more physical properties of the at least a second carton, and the determined as-positioned locations of the first carton and the at least a second carton in the pallet space or in the container space.

11. The system of claim 10, wherein the one or more physical properties include at least one of: an identity, one or more dimensions, a weight, and a robotic manipulation capability attribute, of a respective carton of the first and the at least a second carton, and wherein, for at least one of: (ii) determining the one or more physical properties of the first carton, and (vii) determining the one or more physical properties of the at least a second carton, the one or more processors are further programmed to at least one of:
(a) capture, by at least one sensor in communication with the one or more processors, at least one image of at least a portion of the respective carton;
(b) analyze the at least one image to extract the one or more physical properties of the respective carton;
(c) receive, from a transmitter device positioned in or on the respective carton and in communication with the one or more processors, a signal encoding data including the one or more physical properties of the respective carton;
(d) decode the signal received from the transmitter device to extract the one or more physical properties of the respective carton;
(e) receive, from a commissioning system in communication with the one or more processors, a signal encoding data including the one or more physical properties of the respective carton; and
(f) decode the signal received from the commissioning system to extract the one or more physical properties of the respective carton.

12. The system of claim 11, wherein, for at least one of: (iii) associating the one or more physical properties of the first carton with the first identifier, and (viii) associating the one or more physical properties of the at least a second carton with the at least a second identifier, the one or more processors are further programmed to:
(g) associate at least one of: the extracted identity, the extracted one or more dimensions, the extracted weight, and the extracted robotic manipulation capability attribute, of the respective carton with a respective identifier of the first and the at least a second identifier.

13. The system of claim 11, wherein, for generating the 3D map, the one or more processors are further programmed to generate the 3D map of the pallet space or the container space further based on at least one of: the extracted identity, the extracted one or more dimensions, the extracted weight, and the extracted robotic manipulation capability attribute, of the respective carton.

14. The system of claim 11, wherein the one or more processors are further programmed to determine if the respective carton is capable of robotic manipulation without human intervention.

15. The system of claim 10, wherein the one or more processors are further programmed to:
assign an identifier to the pallet or to the container; and
associate the generated 3D map with the identifier of an as-constructed pallet or an as-loaded container.

16. The system of claim 15, wherein the one or more processors are further programmed to determine an unloading protocol for the as-constructed pallet or the as-loaded container, and wherein, for associating the generated 3D map with the as-constructed pallet or the as-loaded container, wherein the one or more processors are further programmed to: store the generated 3D map of the pallet space or the container space in the one or more memory devices in association with the determined unloading protocol of the as-constructed pallet or the as-loaded container, respectively.

17. The system of claim 16, wherein the one or more processors are further programmed to transmit the generated 3D map of the pallet space or the container space to a receiving facility for the as-constructed pallet or the as-loaded container, respectively.

18. The system of claim 15, wherein the one or more processors are further programmed to determine a loading protocol for: a plurality of as-constructed pallets, or a plurality of as-loaded containers, for placement on a freight delivery mode, and wherein, for associating the generated 3D map with the as-constructed pallet or the as-loaded container, wherein the one or more processors are further programmed to:
associate each of a plurality of generated 3D maps with: each of the plurality of as-constructed pallets, or each of the plurality as-loaded containers; and
store the generated 3D maps of: each pallet space of the plurality of as-constructed pallets, each container space of the plurality of as-loaded containers, in the one or more memory devices in association with the determined loading protocols of: the plurality as-constructed pallets, or the plurality of as-loaded containers, respectively.

19. The system of claim 18, wherein the one or more processors are further programmed to transmit the generated 3D maps of: the each pallet space of the plurality of as-constructed pallets, or the each container space of the plurality of as-loaded containers, to the freight delivery mode.

20. A non-transient computer-readable storage medium storing processor-executable instructions for mapping locations of cartons, which, when executed by one or more processors, cause the one or more processors to:
for a first carton:
(i) assign a first identifier to the first carton received for positioning in: a pallet space of a pallet, or in a container space of a container;
(ii) determine one or more physical properties of the first carton;
(iii) associate the one or more physical properties of the first carton with the first identifier;
(iv) determine an as-positioned location of the first carton in the pallet space or in the container space, the pallet space or container space having an assigned global coordinate system, and wherein the as-positioned location of the first carton in the assigned global coordinate system of the pallet space or the container space includes frame coordinates of a local origin of the first carton of a coordinate frame (f) assigned to the first carton, wherein the local origin is defined or at least approximated as a frame point on or proximal to an exterior surface of the carton, the frame point defined as $xf=0$, $yf=0$, and $zf=0$, and an effective volume relative to the assigned coordinate frame (f); and
(v) generate a three-dimensional (3D) map of the pallet space or the container space based on: the determined one or more physical properties of the first carton, and the determined as-positioned location of the first carton in the pallet space or in the container space.

21. The system of claim 10, wherein the one or more processors are further programmed to:
for the first carton and the at least a second carton:
determine an available base plane area of a base plane of the pallet or the container;
determine a volume available for positioning a respective carton of the first and the at least a second carton in the pallet space or the container space;

assign, based on at least: the determined available base plane area, and the volume available, a global coordinate system (pc) to the pallet space or the container space, the global coordinate system (pc) having a global origin defined or at least approximated as a global point on the base plane, the global point defined as $xpc=0$, $ypx=0$, and $zpc=0$; and associate the assigned global coordinate system to: the pallet, or the container.

* * * * *